US011609324B2

(12) United States Patent
Devaraj et al.

(10) Patent No.: US 11,609,324 B2
(45) Date of Patent: Mar. 21, 2023

(54) SYSTEMS FOR SYNTHETIC APERTURE RADAR TRANSMIT AND RECEIVE ANTENNAS

(71) Applicant: Planet Labs Inc., San Francisco, CA (US)

(72) Inventors: Kiruthika Devaraj, Mountain View, CA (US); Ming-chun Paul Lee, San Francisco, CA (US)

(73) Assignee: Planet Labs Inc., San Francisco, CA (US)

( * ) Notice: Subject to any disclaimer, the term of this patent is extended or adjusted under 35 U.S.C. 154(b) by 190 days.

(21) Appl. No.: 16/889,655

(22) Filed: Jun. 1, 2020

(65) Prior Publication Data
US 2020/0292695 A1  Sep. 17, 2020

Related U.S. Application Data

(63) Continuation of application No. 15/721,567, filed on Sep. 29, 2017, now Pat. No. 10,670,711.

(51) Int. Cl.
*G01S 13/90* (2006.01)
*G01S 7/03* (2006.01)
(Continued)

(52) U.S. Cl.
CPC ............ *G01S 13/9058* (2019.05); *G01S 7/03* (2013.01); *G01S 7/032* (2013.01); *G01S 13/10* (2013.01);
(Continued)

(58) Field of Classification Search
CPC ...................................................... H01Q 3/46
See application file for complete search history.

(56) References Cited

U.S. PATENT DOCUMENTS 4,491,845 A   1/1985  Rothenberg
4,707,839 A  11/1987  Andren et al.
(Continued)

FOREIGN PATENT DOCUMENTS

EP   2650695 B1  10/2015
EP   3688838 A1   8/2020
(Continued)

OTHER PUBLICATIONS

"Datasheet: CLTE™ and CLTE-XT™ Circuit Materials"; publication #92-201; published by Rogers Corporation, Chandler, AZ, USA; published on Mar. 23, 2021. No author is given. (Year: 2021).*

(Continued)

*Primary Examiner* — Bernarr E Gregory
(74) *Attorney, Agent, or Firm* — KPPB LLP

(57) ABSTRACT

Synthetic aperture radar transmit and receive antenna systems and methods of transmitting and receiving radar signals are disclosed. In one embodiment, a transmit and receive antenna system includes a transmit antenna array configured to transmit a plurality of radio frequency transmit signals, the transmit antenna array including a plurality of patch antenna elements mounted to a printed circuit board, each patch antenna element belonging to a subarray, and one or more power amplifiers, each power amplifier feeding a subarray of the patch antenna elements, and a reflectarray receive antenna configured to receive radio frequency signals including a plurality of reflectarray antenna elements mounted to a printed circuit board, at least one antenna feed configured to receive radio frequency signals reflected from the plurality of reflectarray antenna elements, and at least one low noise amplifier electrically connected to the at least one antenna feed.

21 Claims, 21 Drawing Sheets

(51) Int. Cl.

| | | |
|---|---|---|
| *G01S 13/10* | (2006.01) | |
| *H01Q 3/26* | (2006.01) | |
| *H01Q 9/04* | (2006.01) | |
| *H01Q 15/14* | (2006.01) | |
| *H01Q 19/10* | (2006.01) | |
| *H01Q 21/06* | (2006.01) | |
| *H01Q 21/29* | (2006.01) | |
| *G01S 7/02* | (2006.01) | |
| *G01S 13/02* | (2006.01) | |
| *H01Q 1/28* | (2006.01) | |
| *H01Q 3/28* | (2006.01) | |
| *H01Q 3/30* | (2006.01) | |
| *H01Q 19/12* | (2006.01) | |

(52) U.S. Cl.
CPC ........ *G01S 13/9011* (2013.01); *H01Q 3/2658* (2013.01); *H01Q 9/0435* (2013.01); *H01Q 15/148* (2013.01); *H01Q 19/10* (2013.01); *H01Q 21/065* (2013.01); *H01Q 21/29* (2013.01); *G01S 7/025* (2013.01); *G01S 7/026* (2013.01); *G01S 2013/0245* (2013.01); *H01Q 1/288* (2013.01); *H01Q 3/28* (2013.01); *H01Q 3/30* (2013.01); *H01Q 19/12* (2013.01)

(56) References Cited

U.S. PATENT DOCUMENTS

| | | | |
|---|---|---|---|
| 5,206,655 | A | 4/1993 | Caille et al. |
| 5,436,973 | A | 7/1995 | Amoroso |
| 6,064,695 | A | 5/2000 | Raphaeli |
| 6,081,235 | A | 6/2000 | Romanofsky et al. |
| 6,384,787 | B1 | 5/2002 | Kim et al. |
| 6,441,787 | B1 | 8/2002 | Richards et al. |
| 6,597,309 | B1 | 7/2003 | Panton et al. |
| 6,642,889 | B1 | 11/2003 | McGrath |
| 7,010,067 | B2 | 3/2006 | Chamberlain |
| 7,030,824 | B1 | 4/2006 | Taft et al. |
| 7,035,310 | B1 | 4/2006 | Roberts |
| 7,791,552 | B1 | 9/2010 | Romanofsky |
| 7,868,829 | B1 | 1/2011 | Colburn et al. |
| 8,249,128 | B2 | 8/2012 | Kunysz |
| 8,290,462 | B2 | 10/2012 | Azadet et al. |
| 8,441,393 | B2 | 5/2013 | Strauch et al. |
| 9,172,145 | B2 | 10/2015 | Puzella et al. |
| 10,551,491 | B2 | 2/2020 | Rubel et al. |
| 10,670,711 | B2 | 6/2020 | Devaraj et al. |
| 2001/0028328 | A1 | 10/2001 | Stjernman et al. |
| 2002/0094042 | A1 | 7/2002 | Chamberlain |
| 2003/0202731 | A1 | 10/2003 | Ionov et al. |
| 2006/0081764 | A1 | 4/2006 | Lee et al. |
| 2007/0046547 | A1* | 3/2007 | Crouch ............... H01Q 3/46 343/754 |
| 2007/0063898 | A1 | 3/2007 | Phelan et al. |
| 2007/0248145 | A1 | 10/2007 | Kunysz |
| 2009/0135085 | A1 | 5/2009 | Raby et al. |
| 2010/0039313 | A1 | 2/2010 | Morris |
| 2010/0197264 | A1 | 8/2010 | Azadet et al. |
| 2011/0193739 | A1 | 8/2011 | Strauch et al. |
| 2012/0028690 | A1 | 2/2012 | Liu |
| 2012/0162010 | A1 | 6/2012 | Georgiadis et al. |
| 2012/0230371 | A1 | 9/2012 | Chiskis |
| 2012/0268315 | A1 | 10/2012 | Tirkel et al. |
| 2014/0009326 | A1 | 1/2014 | Wishart |
| 2014/0269856 | A1 | 9/2014 | Gianvittorio et al. |
| 2016/0146983 | A1 | 5/2016 | Iluz et al. |
| 2016/0197394 | A1 | 7/2016 | Harvey et al. |
| 2016/0322714 | A1 | 11/2016 | Ying et al. |
| 2017/0126310 | A1 | 5/2017 | Petrovic et al. |
| 2017/0179596 | A1 | 6/2017 | Diaz et al. |
| 2018/0259639 | A1 | 9/2018 | Rubel et al. |
| 2019/0101639 | A1 | 4/2019 | Rincon et al. |
| 2019/0101640 | A1 | 4/2019 | Devaraj et al. |

FOREIGN PATENT DOCUMENTS

| | | |
|---|---|---|
| WO | 2001067652 A1 | 9/2001 |
| WO | 2012120137 A1 | 9/2012 |
| WO | 2016053501 A1 | 4/2016 |
| WO | 2018165479 A1 | 9/2018 |
| WO | 2019068030 A1 | 4/2019 |

OTHER PUBLICATIONS

G. Ucuncu, "X Band Two Layer Printed Reflectarray With Shaped Beam"; Master's thesis from Middle East Technical University; Ankara, Turkey; published Oct. 2011. (Year: 2011).*
E. Carrasaco et al., "Dual-polarization reflectarray elements for Ku-band Tx/Rx portable terminal antenna"; conference paper from ResearchGate, dated Apr. 2010. (Year: 2010).*
Y. Pan, "Analysis and Design of Reflectarray Antennas for Radar System Applications"; Doctoral dissertation from University of Oklahoma; Norman, OK, USA; published in the year 2014. (Year: 2014).*
A. G. Roederer, "Reflectarray Antennas"; published in the proceedings of the 2009 3rd European Conference on Antennas and Propagation; published by IEEE; Piscataway, NJ, USA; added to IEEE Xplore on Jun. 5, 2009. (Year: 2009).*
Extended European Search Report for European Application No. 18860565.3, Search completed May 18, 2021, dated Jun. 1, 2021, 10 Pgs.
International Preliminary Report on Patentability for International Application PCT/US2018/021618, Report issued Jun. 20, 2019, dated Jul. 5, 2019, 18 Pgs.
International Preliminary Report on Patentability for International Application PCT/US2018/053619, Report issued Mar. 31, 2020, dated Apr. 9, 2020, 12 Pgs.
International Search Report and Written Opinion for International Application No. PCT/US2018/021618, Search completed May 29, 2018, dated Jun. 11, 2018, 15 Pgs.
International Search Report and Written Opinion for International Application No. PCT/US2018/053619, Search completed Nov. 26, 2018, dated Dec. 7, 2018, 13 Pgs.
"Spaceborne Polarimetric Synthetic Aperture Radar", Dipartimento di Ingengneria Civile e Ingengneria Informatica—DICII, Retrieved on Mar. 6, 2017, 108 pgs.
Alfonzo et al., "Orthogonal Waveform Experiments with a Highly Digitized Radar", EUSAR 2012, pp. 103-106, 2012.
Chen et al., "A Novel Image Formation Algorithm for High-Resolution Wide-Swath Spaceborne SAR Using Compressed Sensing on Azimuth Displacement Phase Center Antenna", Progress in Electromagnetics Research, 2012, vol. 125, pp. 527-542.
Ender, "Space-time processing for multichannel synthetic aperture radar", Electronics & Communication Engineering Journal, Feb. 1999, pp. 29-38.
Horn, "Interesting eigenvectors of the Fourier transform", Transactions of the Royal Society of South Africa, Jun. 2010, vol. 65, No. 2, pp. 100-106, Doi: 10.1080/0035919X.2010.510665.
Kamoda et al., "Experimental Verification of Novel Method to Reduce Quantization Lobes for Phased Array Radar", Radar Conference (EURAD), 2012 9th European, IEEE, XP032326786, pp. 337-340.
Muehe et al., "Displaced-Phase-Center Antenna Technique", Lincoln Laboratory Journal, 2000, vol. 12, No. 2, pp. 281-296.
Pillai et al., "A New Estimation Technique for High-Resolution Bathymetry", "Signal Processing"; Year 2000, vol. 80; pp. 809-818.
Rajagopal et al., "FPGA Implementation of Pseudo Noise Sequences Based on Quadratic Residue Theory", International Journal of Computer Applications (0975-8887), Jan. 2016, vol. 134, No. 9, pp. 10-14.
Unknown, "Appendix A—Principles of Synthetic Aperture Radar", University of California San Diego, Class: Satellite Remote Sensing— SIO 135/SIO 236, Retrieved on Mar. 1, 2017, pp. A1-14.
Unknown, "Synthetic-Aperture Radar (SAR) Basics", The University of Kansas, C. Allen, Retrieved on Mar. 6, 2017, 93 pgs.

(56) References Cited

OTHER PUBLICATIONS

"Reflective array antenna", Wikipedia, Updated Dec. 14, 2016, Retrieved from the Internet https:en.wikipedia.org/wiki/Reflective_array_antenna on Sep. 1, 2017.

"Synthetic-aperture radar", Wikipedia, Updated Jul. 7, 2017, Retrieved from the Internet https://wikipedia.org/wiki/Synthetic-aperture_radar on Sep. 20, 2017.

\* cited by examiner

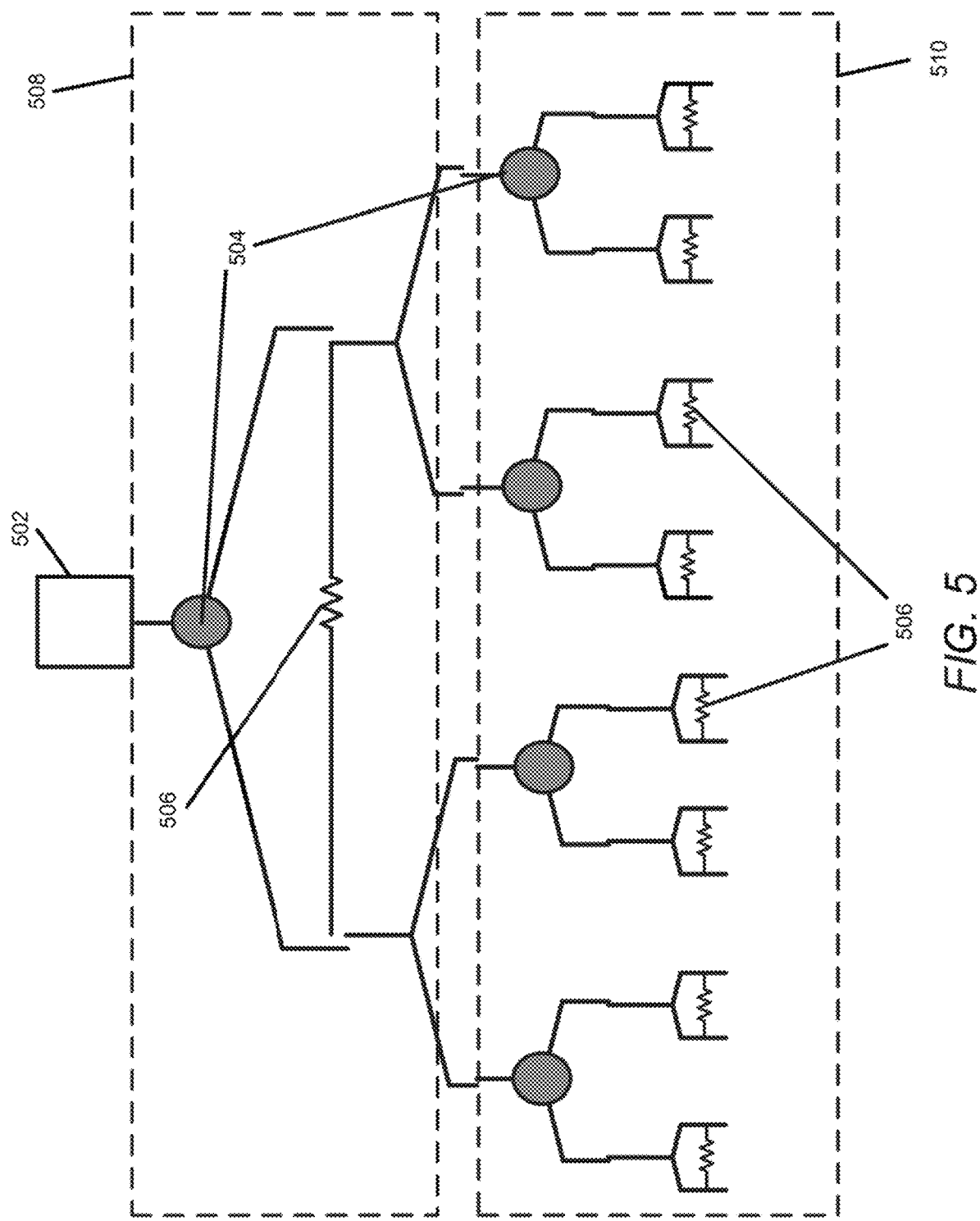

SYSTEMS FOR SYNTHETIC APERTURE RADAR TRANSMIT AND RECEIVE ANTENNAS

CROSS-REFERENCE TO RELATED APPLICATIONS

The current application is a continuation of U.S. patent application Ser. No. 15/721,567 filed on Sep. 29, 2017, now U.S. Pat. No. 10,670,711, the disclosure of which is incorporated herein in its entirety.

FIELD OF THE INVENTION

The present invention relates generally to synthetic aperture radar antenna systems and more specifically to space based synthetic aperture radar antenna systems using array and reflector type antennas.

BACKGROUND

The term synthetic aperture radar (SAR) is often used to describe radar systems that use a moving antenna to simulate an extremely large antenna or aperture electronically. SAR systems are often mounted to airborne or space-based platforms and are mounted at an angle relative to the flight path of the platform to which the antenna is mounted. A monostatic SAR utilizes the same platform for the transmitter and receiver.

The flight path of the platform on which an SAR is mounted defines the azimuth direction with the antenna generally focused on a direction orthogonal to the azimuth (See FIG. 1). The direction in which the antenna is directed is often referred to as the range or slant-range. If the direction of observation is perpendicular to the direction of travel, the system is typically defined as a boresight system. Otherwise it can be called a squinted system.

In a SAR system, data is acquired by transmitting a radio pulse and receiving a signal backscattered by the imaged scene. In such systems, resolution in range increases with the bandwidth of the transmitted pulse. In many systems a frequency modulated pulse, referred to as a chirp that is a linear frequency sweep is utilized to achieve high resolution without decreasing pulse duration. Chirps are interspersed with quiescent periods for reception. In polarimetric SAR systems, chirps are typically transmitted with alternating polarities.

For space-based SAR systems, orbital speed can be so high that a large antenna is required to enable a pulse repetition rate that is sufficiently low to avoid range ambiguity. Increasing the size of the antenna reduces azimuth resolution in strip map mode. The decrease in resolution can be offset by operating in spotlight mode with a consequent loss of collection area rate. Often, the resulting physical antenna is longer than signal-to-noise considerations alone would otherwise require. The requirement of a large antenna, coupled with typically tight antenna RF precision requirements, typically means that either an expensive rocket with a large payload fairing is required, or a large, high-precision structure must be unfurled in space, raising engineering and manufacturing costs and mission risk. And indeed, space-based SAR missions launched to date typically feature either a long, often segmented antenna, or a large deployed parabolic dish.

SUMMARY OF THE INVENTION

Synthetic aperture radar transmit and receive antenna systems and methods of transmitting and receiving radar signals are disclosed. In one embodiment, a transmit and receive antenna system includes a transmit antenna array configured to transmit a plurality of radio frequency transmit signals, the transmit antenna array including a plurality of patch antenna elements mounted to a printed circuit board, each patch antenna element belonging to a subarray, and one or more power amplifiers, each power amplifier feeding a subarray of the patch antenna elements, and a reflectarray receive antenna configured to receive radio frequency signals including a plurality of reflectarray antenna elements mounted to a printed circuit board, at least one antenna feed configured to receive radio frequency signals reflected from the plurality of reflectarray antenna elements, and at least one low noise amplifier electrically connected to the at least one antenna feed.

In a further embodiment, the transmit antenna array also includes at least one Wilkinson divider electrically connected to a plurality of patch antenna elements.

In another embodiment, each power amplifier of the transmit antenna array is configured to generate at least a 15 watt output.

In still another embodiment, each power amplifier of the transmit antenna array is a gallium nitride amplifier.

In a yet further embodiment, the transmit antenna array also includes at least one copper plate embedded in the printed circuit board.

In yet another embodiment, the transmit antenna array also includes at least one power amplifier embedded in the printed circuit board.

In a further embodiment again, the at least one low noise amplifier of the receive reflectarray includes at least two low noise amplifiers each configured to receive and amplify a radio frequency signal of a different polarization.

In another embodiment again, the transmit antenna array and receive reflectarray are configured for a frequency range of operation of 9.5 GHz to 9.8 GHz.

In a further additional embodiment, the printed circuit board of the receive reflectarray includes a (polytetrafluoroethylene) PTFE dielectric material.

In another additional embodiment, the feed for the transmit antenna array includes a single digital to analog converter and upconverter.

In a still yet further embodiment, the receive reflectarray includes a stack of receive reflectarrays.

In still yet another embodiment, the bandwidth of the signal reflected by the receive reflectarray is broader than the bandwidth of the single reflected by at least one of the reflectarrays in the stack of reflectarrays.

In a still further embodiment again, the bandwidth of the signal reflected by the receive reflectarray is broader than the bandwidth of the single reflected by each of the reflectarrays in the stack of reflectarrays.

In still another embodiment again, the transmit antenna and the reflectarray receive antenna are mounted to two separate surfaces of a housing.

In a still further additional embodiment, the housing is configured to collapse and the transmit antenna and the reflectarray receive antenna are contained within the housing when the housing is collapsed.

In still another additional embodiment, the antenna feed of the reflectarray receive antenna is mounted to a feed arm that is configured to collapse.

In a yet further embodiment again, the feed arm is configured to be contained within the housing between the two separate surfaces on which the transmit antenna and the reflectarray receive antenna are mounted when the housing is collapsed.

In yet another embodiment again, a transmit and receive antenna system includes a transmit antenna array configured to transmit a plurality of radio frequency transmit signals, the transmit antenna array including a plurality of patch antenna elements mounted to a printed circuit board, each patch antenna element belonging to a subarray, one or more power amplifiers, each power amplifier feeding a subarray of the patch antenna elements, and a feed that feeds the one or more power amplifiers and includes a single digital to analog converter and a single upconverter, and a reflectarray receive antenna configured to receive radio frequency signals including a stackup of a plurality of layers of reflectarray antenna elements, at least one antenna feed configured to receive radio frequency signals reflected from the plurality of reflectarray antenna elements, and at least one low noise amplifier electrically connected to the at least one antenna feed.

In a yet further additional embodiment, each power amplifier of the transmit antenna array is a gallium nitride amplifier, and the transmit antenna array and reflectarray receive antenna are configured for a frequency range of operation of 9.5 GHz to 9.8 GHz.

In yet another additional embodiment, a transmit and receive antenna system includes a transmit antenna array mounted to first surface of a housing and configured to transmit a plurality of radio frequency transmit signals, the transmit antenna array including a plurality of patch antenna elements mounted to a printed circuit board, each patch antenna element belonging to a subarray, and one or more power amplifiers, each power amplifier feeding a subarray of the patch antenna elements, and a reflectarray receive antenna mounted to a second surface of the housing and configured to receive radio frequency signals including a plurality of reflectarray antenna elements mounted to a printed circuit board, at least one antenna feed mounted to a feed arm configured to receive radio frequency signals reflected from the plurality of reflectarray antenna elements, and at least one low noise amplifier electrically connected to the at least one antenna feed, where the housing is configured to collapse and the transmit antenna and the reflectarray receive antenna are contained within the housing when the housing is collapsed, where feed arm to which the antenna feed of the reflectarray receive antenna is mounted is configured to collapse, and where the feed arm is configured to be contained within the housing between the two separate surfaces on which the transmit antenna and the reflectarray receive antenna are mounted when the housing is collapsed.

BRIEF DESCRIPTION OF THE DRAWINGS

FIG. 5 illustrates a schematic of a power distribution network of a transmit phased array antenna in accordance with embodiments of the invention.

DETAILED DESCRIPTION

Turning now to the drawings, synthetic aperture radar transmit and receive antenna systems and methods of transmitting and receiving radar signals are disclosed. Space based systems often have severe size, weight, and power constraints. Consequently, there is a need for effective and cost efficient antenna systems for space based systems. Reflector type dish antennas that have been used in the past are typically broadband, have high directivity and efficiency, and are the ideal choice for satellites if the can be accommodated. However, these dish type antennas are bulky, expensive to fabricate, and costly to deploy due to their size and configuration. Planar antenna arrays provide an alternative to the dish type antennas because they are more compact but they may suffer from efficiency problems inside complex feed networks. The use of planar arrays and reflectarray antennas in accordance with various embodiments of the invention may be well suited to fit within the size and volume constraints of micro satellite systems. These antennas offer a low profile and the ability to be compacted to fit within the space constraints of micro satellite systems. As will be discussed in greater detail below, antenna systems in accordance with several embodiments of the invention may use a combination of these antennas for transmitting and receiving radar signals and, more specifically, utilize a modular phased array antenna for the transmitter portion and a reflectarray antenna for the receiver portion.

A synthetic aperture radar (SAR) in accordance with many embodiments of the invention typically operates by transmitting a frequency modulated pulse, referred to as a chirp, and receiving reflected signals backscattered by the target scene. In a number of embodiments of the invention, a SAR antenna system may utilize a waveform generated by convolving pseudonoise sequences with any of a variety of kernels which can be referred to as a superchirp. Systems and methods for generating, transmitting, and receiving superchirps are described in U.S. patent application Ser. No. 15/640,280, filed on Jun. 30. 2017, now U.S. Pat. No. 10,551,491, the disclosure of which, including (but not limited to) the portions of the disclosure relevant to generating, transmitting, and receiving radio frequency signals, is incorporated herein by reference in its entirety.

Figure 1:
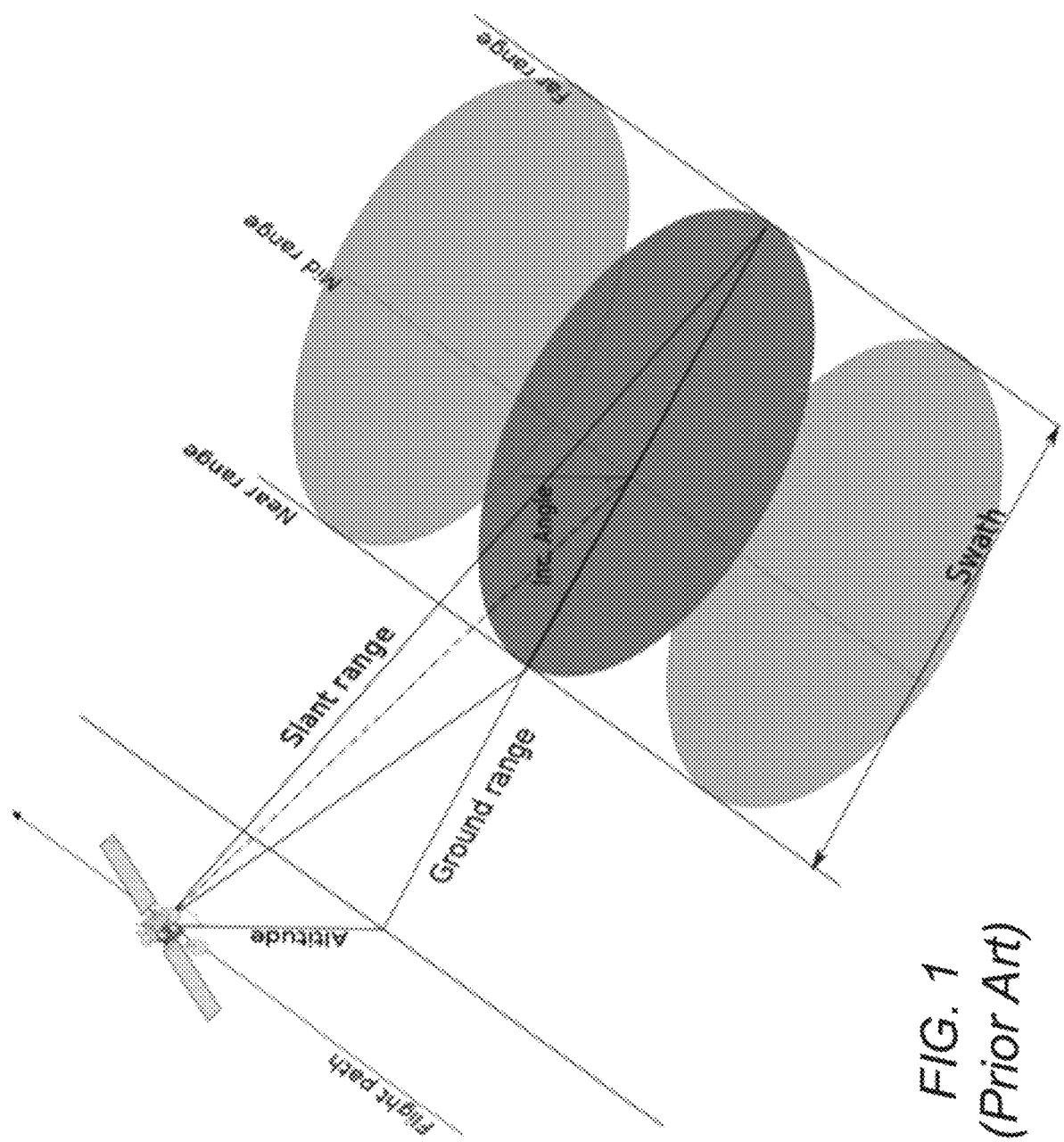
FIG. 1 generally illustrates a traditional space based SAR satellite system.
Figure 2:
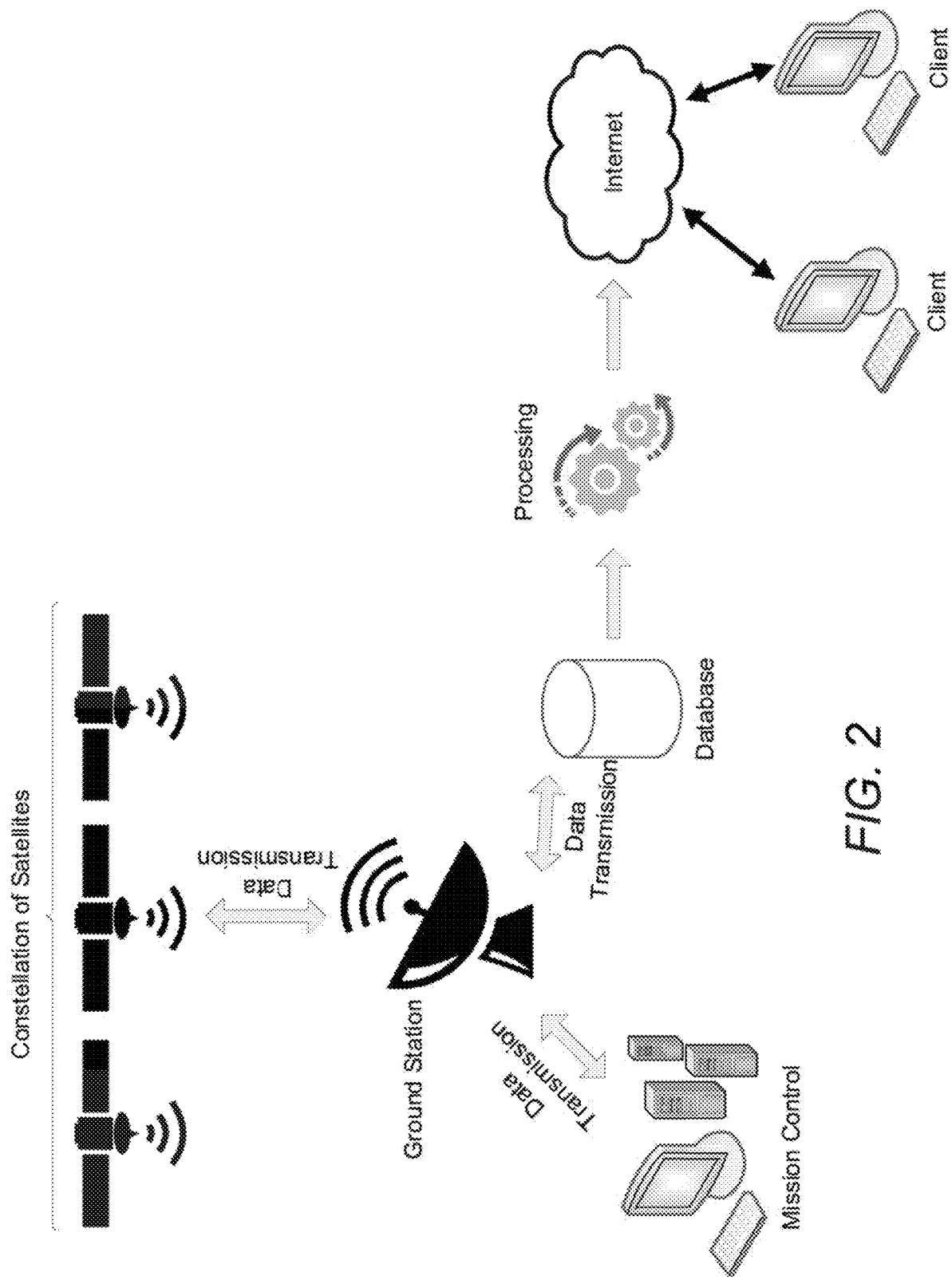
FIG. 2 illustrates an imaging satellite system including a constellation of satellites that interact with a ground system in controlling the constellation of satellites in accordance with embodiments of the invention.

FIG. 2 illustrates one embodiment of the invention in conjunction with a satellite constellation system. FIG. 2 illustrates an imaging satellite system—whereby at least one satellite includes a SAR system that interfaces with a single ground station. In particular, FIG. 2 illustrates a constellation of satellites operable to collect data including (but not limited to) image data and/or raw or compressed phase history data. Any of a variety of satellite classes can be implemented in accordance with various embodiments of the invention. For example, in many embodiments, small satellites are implemented. In a number of embodiments, more conventional satellites are implemented.

FIG. 2 illustrates that the constellation of satellites interacts with at least one Ground Station. Thus, for instance, the constellation of satellites can relay acquired imaging data as well as respective positioning information to the Ground Station. At least one Ground Station can be used to communicate with the constellation of satellites generally, and more specifically to control the trajectory and operation of the various satellites within the constellation. Thus, for example, FIG. 2 illustrates that a Mission Control center can be used to interact with at least one Ground Station and thereby control the operation of the constellation of satellites. Mission Control can be in wireless communication with the Ground Station or in wired communication with the Ground Station. In many embodiments, optical links and/or optical crosslinks are utilized to connect to at least one Ground Station to facilitate high speed data transfer.

While a particular configuration has been illustrated with respect to FIG. 2, and variants have been discussed, it should be clear that any suitable system for implementing a constellation of satellites can be implemented in accordance with embodiments of the invention.

Figure 3:
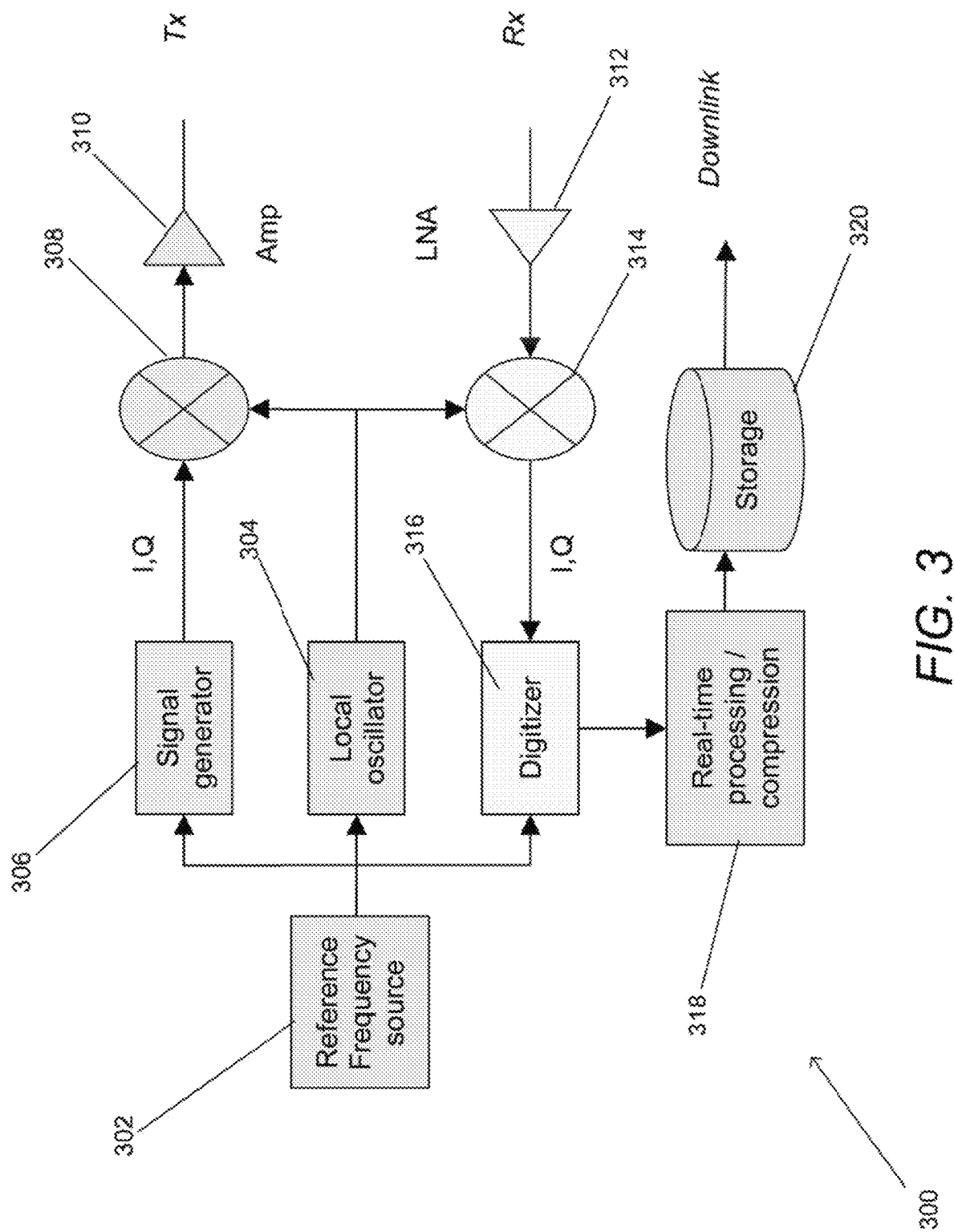
FIG. 3 conceptually illustrates a transmit and receive chain that may be utilized in accordance with embodiments of the invention.

In accordance with some embodiments of the invention the Antenna system may utilize a SAR system as illustrated in FIG. 3. The SAR system, as illustrated in FIG. 3, may implement a transmitting and receiving chain using a software defined radio. Both the transmit chain and the receive chain rely upon the ability of the SAR system (300) to generate a stable carrier signal. In the illustrated embodiment, a reference signal (302) that has a stable frequency is utilized to drive a local oscillator circuit (304). The local oscillator circuit (304) can provide a sinusoidal carrier frequency to both the transmitting and receiving chains. The reference signal can also be utilized to generate the baseband superchirp signal using a waveform generator (306). The baseband superchirp signal generated by the waveform generator (306) can be mixed with the carrier frequency by a mixer (308) and the resulting RF signal can be amplified by an RF amplifier (310) for transmission via an antenna system (not shown).

In the illustrated embodiment, the SAR system is monostatic and the antenna system also receives backscatters of the transmitted superchirps. In many embodiments, a bistatic or multistatic implementation can be utilized in which the Tx and Rx portions of the circuity would be separated with due care taken to match the frequency and timing of the reference signals utilized by each circuit. The received backscattered signals are amplified using a low noise amplifier (312) and the amplified signal is down mixed to baseband or an intermediate signal using a mixer (314) and the reference signal. The downmixed signal can be digitized using an analog-to-digital converter (316). The digitized data can then be processed in real time within the SAR imaging platform using a processing system (318) and/or stored in a storage device (320) for transmission via a downlink. In certain embodiments, the processing system is an FPGA and/or an alternative form of application specific circuit. In a number of embodiments, the processing system is a computing system including at least one processor and a set of machine readable instructions stored in memory that configure the processor to execute instructions to process the digitized signals received by the SAR system.

While a variety of implementations of SAR systems are described above with reference to FIG. 3, any of a variety of hardware and/or software implementations can be utilized to implement a SAR system as appropriate to the requirements of a given application in accordance with various embodiments of the invention. A discussion of various combinations of antenna systems that can be utilized within bistatic systems is provided below. As can readily be appreciated, individual antennas may be utilized in monostatic configurations in accordance with various embodiments of the invention.

Transmit Modular Phased Array Antenna

In many embodiments of the invention, a modular phased array antenna is utilized that has high efficiency as well as high directivity with respect to the aperture size. In a number of embodiments, the modular phased array antenna typically uses a single digital to analog converter, a single upconverter, and an array of 15 W amplifiers that are each organized to feed a subarray of M×N elements. In several embodiments, each amplifier feeds an N×N array of elements. Any number of elements may be sufficient depending on the desired output of the overall system. In certain embodiments, GaN (gallium nitride) amplifiers are utilized because of their high efficiency, fast rise times, and they are easy to handle and test due to heat distribution over large surface areas. Furthermore, GaN amplifiers can operate at comparatively high temperatures (e.g. temperatures greater than 125° C. at the baseplate) compared to amplifiers implemented using other semiconductor processes such as GaAs (gallium arsenide). Accordingly, passive cooling is feasible using GaN amplifiers in circumstances in which passive cooling would be inadequate to maintain other types of amplifiers at safe operating temperatures. In many embodiments, high temperatures can be further tolerated by measuring temperature at individual power amplifiers and switching off power amplifiers that exceed a temperature threshold. In this way, the array can experience graceful decay in the event that localized temperatures approach unsafe operation thresholds. Use of GaN amplifiers can also enable the modular phased array antennas to experience low feed losses and higher reliabilities. When constructing a modular phased array, each subarray element typically requires control and monitoring, power supply, and phase shifters.

Patch Element Unit Cell

Figure 4A:
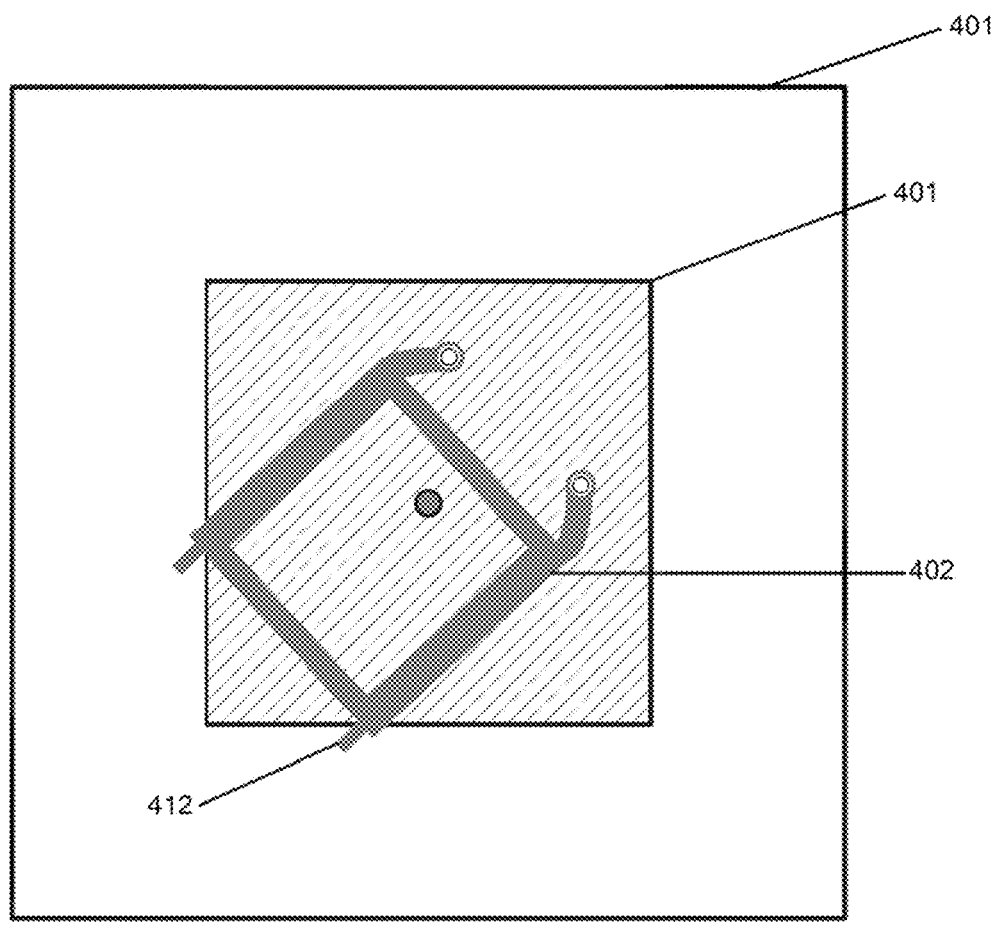
FIG. 4A illustrates a top plan view patch element cell of a transmit phased array antenna element in accordance with embodiments of the invention.
Figure 4B:
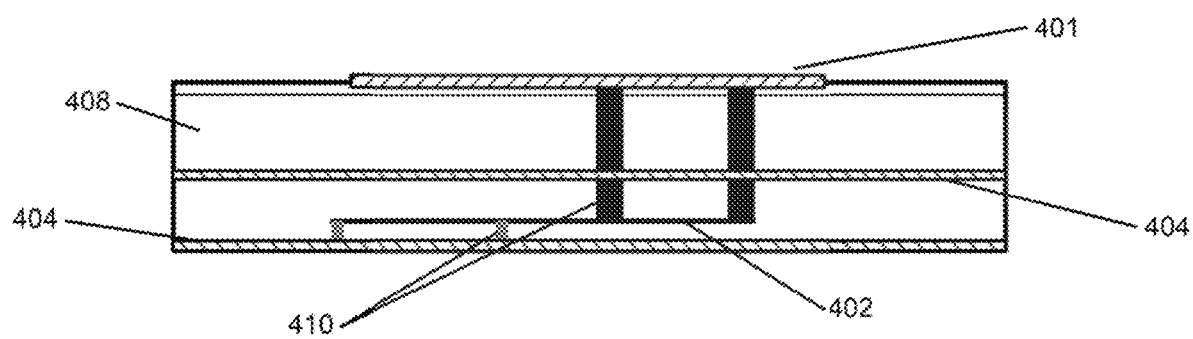
FIG. 4B illustrates a side elevation view of the structure of a patch element cell of a transmit phased array antenna element in accordance with embodiments of the invention.

A patch element (400) in accordance with an embodiment of the invention is illustrated in FIGS. 4A and 4B. FIG. 4A illustrates a patch element (401) that includes dual linear polarizations that feed the integrated patch element (400). In order to generate circular polarization from the dual linear polarizations some embodiments may utilize a hybrid structure (402) similar to the quadrature hybrid shown in FIG. 4A and 4B. The hybrid structure (402) can be beneficial because of the simplicity and available bandwidth that such a structure can provide. Additionally, as illustrated in the layered diagram of FIG. 4B, a thicker dielectric or core material (408) can be utilized depending upon the bandwidth requirements of a specific application and the specific dielectric properties of the selected material(s). In some embodiments the core material (408) may include the use of Rogers CLTE-XT® and 2929 bond ply for the low dielectric constant, low loss, and thermal stability advantages. In other embodiments, any of a variety of materials including (but not limited to) polytetrafluoroethylene (PTFE) dielectric materials typically incorporated within high frequency printed circuit boards can be utilized as appropriate to the requirements of specific applications Thermal stability and control can be beneficial to achieving desired function and control of the phased array antenna structure. Therefore certain materials may be integrated into the structure of the individual patch elements (400). In many embodiments integrated metallic cores (404) may be disposed in the dielectric core material (408) and coupled into the overall structure thereby improving the overall thermal efficiency of the structure. In some embodiments copper plates may be embedded in the substrate to improve the thermal efficiency of the individual elements. In other embodiments, any of a variety of thermal layers including (but not limited to) graphite layers and/or carbon fiber layers can be utilized as appropriate to the requirements of a given application.

The structures as illustrated in FIGS. 4A and 4B represent a passive cooling system. Active cooling systems typically require greater power generation than passive cooling systems, increasing the complexity and cost of the overall system.

In many embodiments of the invention the layers as illustrated in FIG. 4B are printed or applied wherein the hybrid structure (402) is embedded in an inner layer and between the dielectric and metallic cores (408 and 404 respectively) and integrally connected to the printed patch element (401) and metallic cores (404) through connectors (410).

Although a specific configuration of the patch element (400) is illustrated in FIGS. 4A and 4B, the patch element (400) may take on any suitable configuration to fit within a desired phased array antenna as appropriate to the requirements of specific applications in accordance with various embodiments of the invention.

Figure 7A:
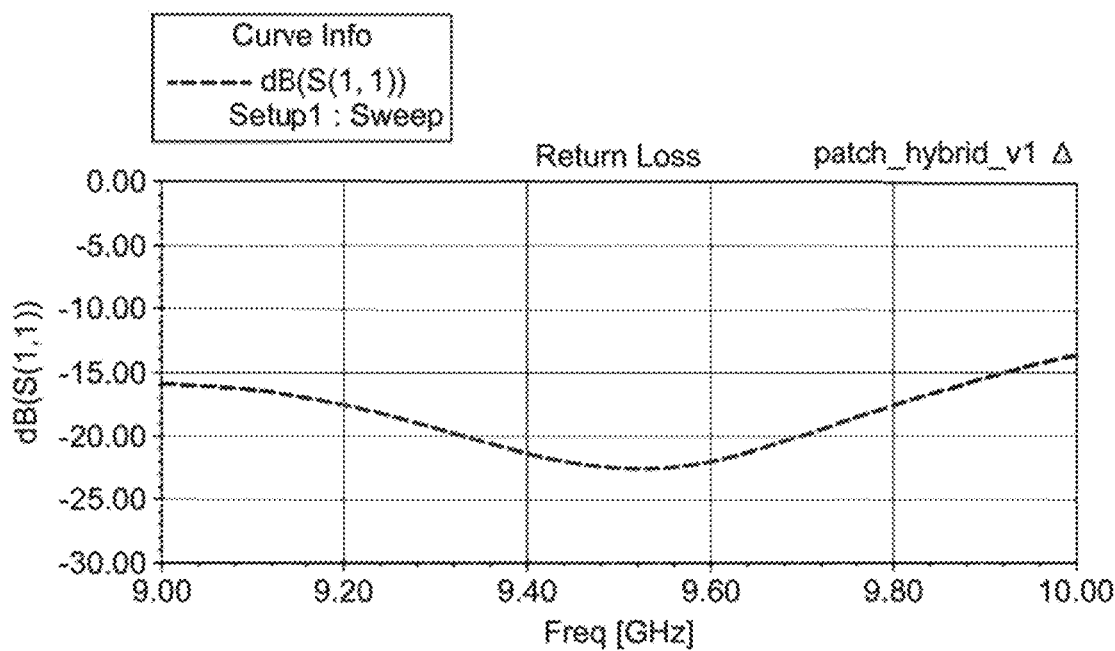
FIG. 7A is a graphical illustration of the return loss of an example individual patch element in accordance with embodiments of the invention.

The return loss of the patch element (400) in accordance with some embodiments of the invention is illustrated in FIG. 7A. The impedance bandwidth is measured using the reflection coefficient (S11) which is the ratio of the incident wave to the reflected wave. The desired reflection coefficient would ideally be less than −15 dB over the desired 300 MHz bandwidth.

Figure 7B:
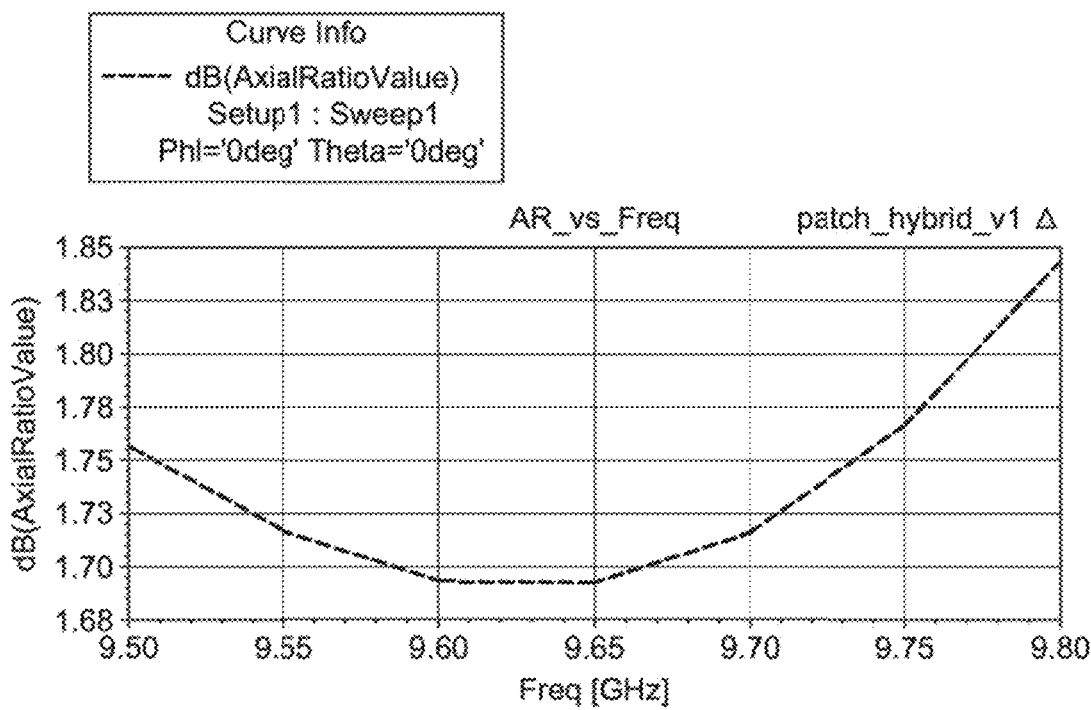
FIG. 7B is a graphical illustration of the reflection coefficient and axial ratio for an example individual patch element in accordance with embodiments of the invention.
Figure 8A:
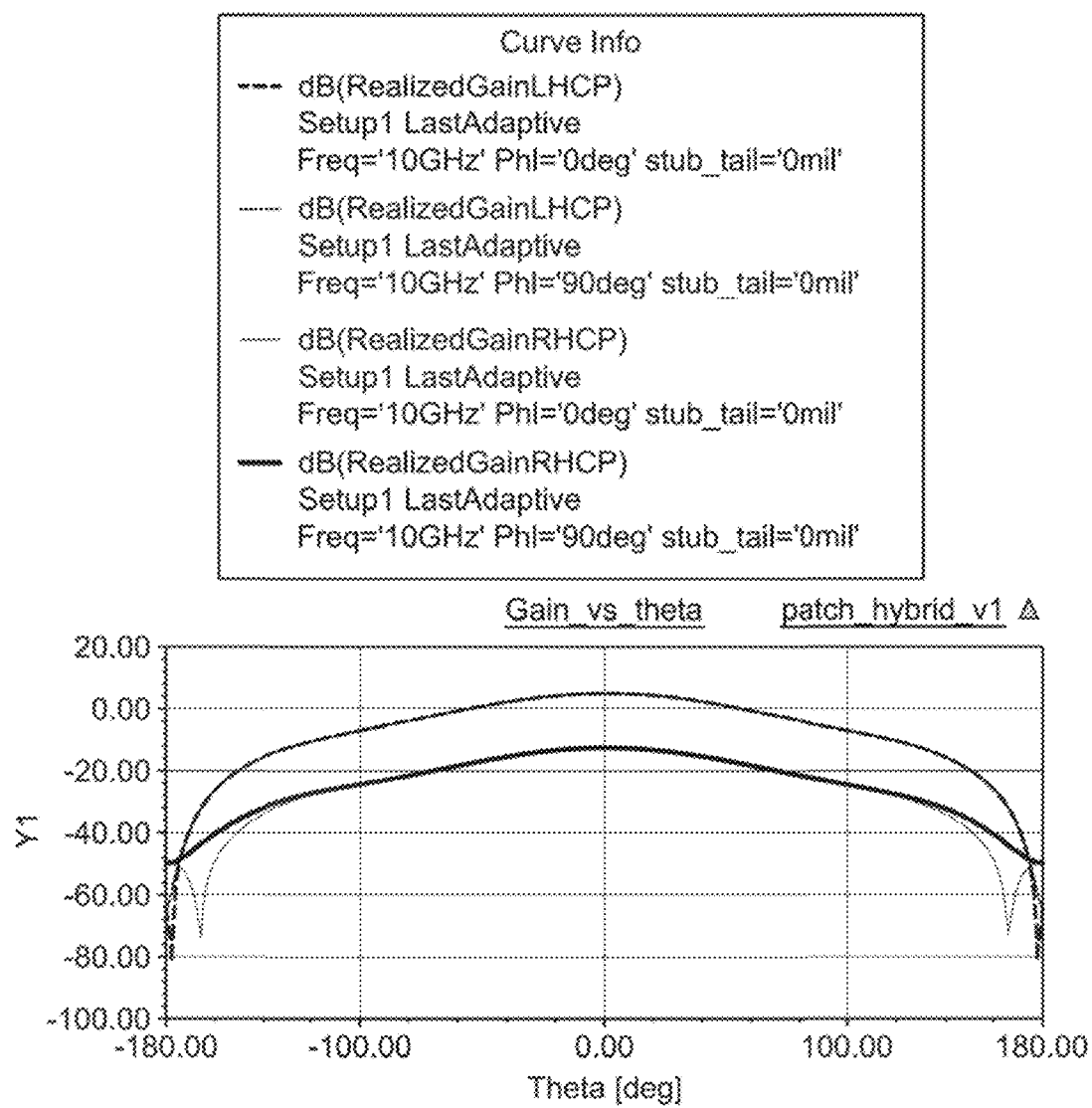
FIG. 8A is a graphical illustration of the gain versus elevation angle of an example individual patch element in accordance with embodiments of the invention.
Figure 8B:
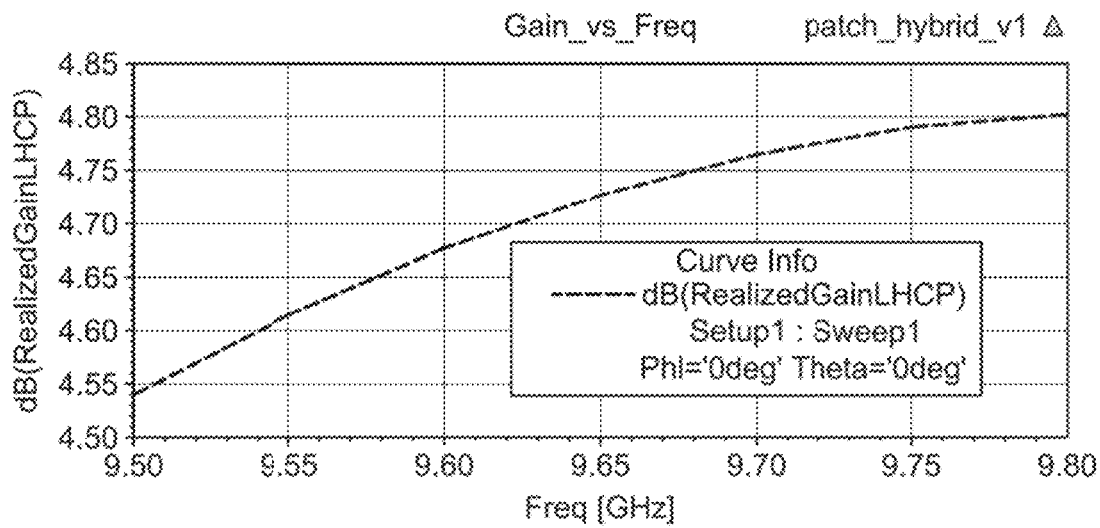
FIG. 8B is a graphical illustration of the gain versus frequency of an example individual patch element in accordance with embodiments of the invention.

Circular polarization may be measured using axial ratio (AR) which is the ratio of major and minor axes of the polarization ellipse. A perfectly circular polarized signal will have an axial ratio of 1 (0 dB) and an axial ratio of <1.5 (3.5 dB) and is considered a circularly polarized wave. FIG. 7B illustrates the axial ratio for a single phased array patch element utilized within transmit arrays in accordance with many embodiments of the invention.

Subarray Power Feed Network

In many embodiments, control circuitry is utilized to attempt to deliver optimal power to each of the patch elements to increase operational efficiency of the radar system. A power feed network as illustrated in FIG. 5 may be used in accordance with some embodiments of the invention to divide the output power from the power amplifier (502) to each of the antenna elements in a subarray. In some embodiments a plurality of layers and corresponding splitter elements (504) may be used within the power distribution network. In various embodiments the power dividers may include Wilkinson power dividers. A Wilkinson power divider utilizes quarter wave transformers and is typically able to achieve isolation between output ports while maintaining a matched condition on all ports. In many embodiments, the Wilkinson power dividers are manufactured as quarter wave lines on printed circuit boards. In some embodiments, the subarray may include an inner layer (510) having four 1-4 power dividers (504) connected to a single 1-4 power divider embedded in an outer layer (508) thus generating a 1 to 16 power feed network. Therefore, a single power amplifier (502) cn provide power to up to 16 individual patch elements. As can readily be appreciated, any of a variety of power dividers including (but not limited to) alternative 1×N Wilkinson power dividers can be utilized to implement a power splitter utilized to feed a transmit subarray as appropriate to the requirements of a given application in accordance with various embodiments of the invention.

Efficient power supply to the individual patch elements as well as high thermal efficiency can be important factors in the overall function of a phased array transmit antenna utilized in accordance with various embodiments of the invention. Therefore, the power amplifiers utilized within the transmit array can be important components in meeting overall system requirements. In some embodiments of the invention, the power amplifier (502) may be of a 15 W GaN power amplifier. In other embodiments, any of a variety of the power amplifiers can be utilized as appropriate to the power and thermal efficiency requirements of specific applications.

Figure 5A:
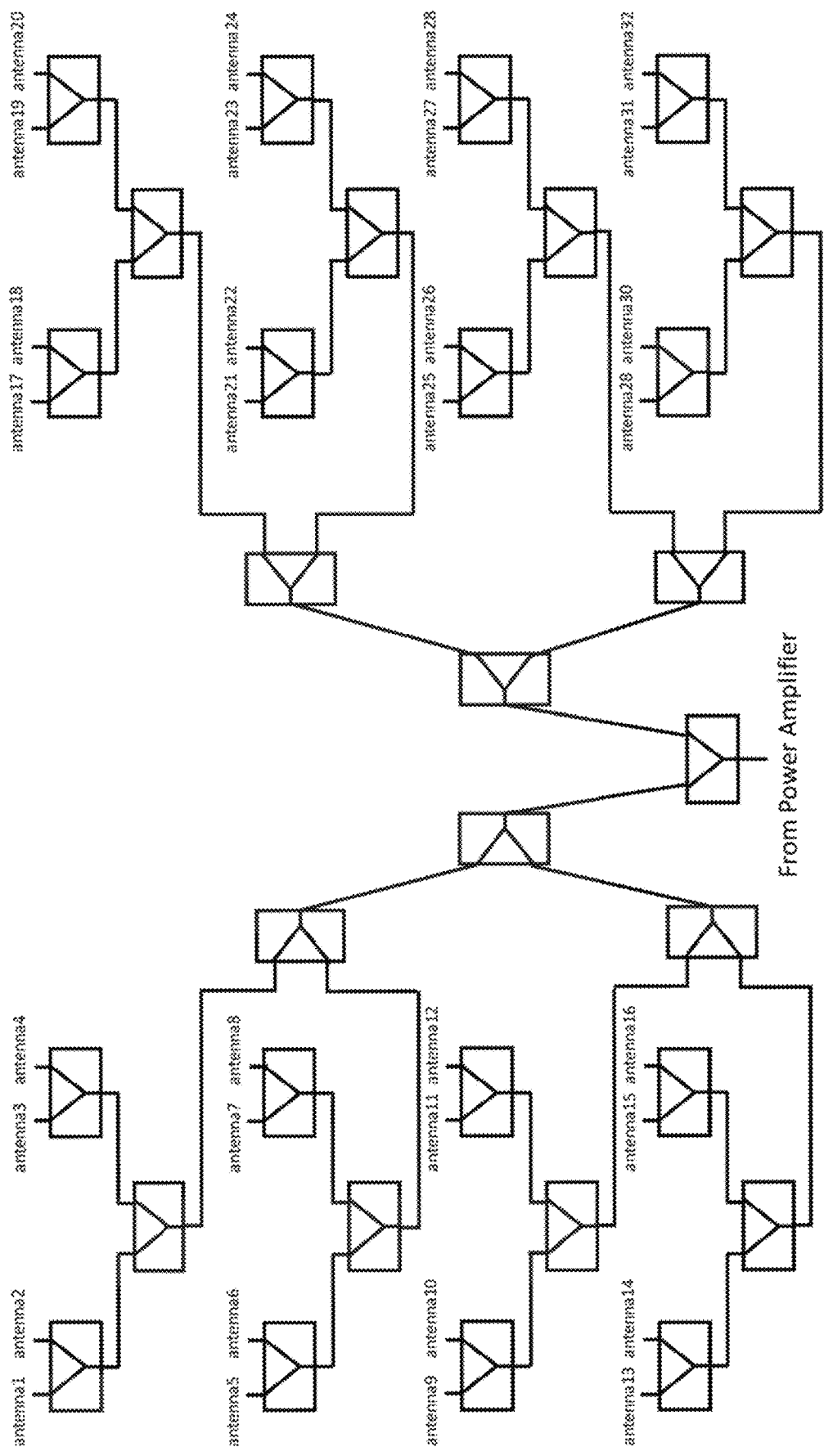
FIG. 5A illustrates a schematic of a power distribution network of a transmit phased array antenna in accordance with embodiments of the invention.

FIG. 5A illustrates a schematic of a power distribution network of a transmit phased array antenna in accordance with embodiments of the invention where a power amplifier feeds a 4×8 module phased array tile.

Figure 5B:
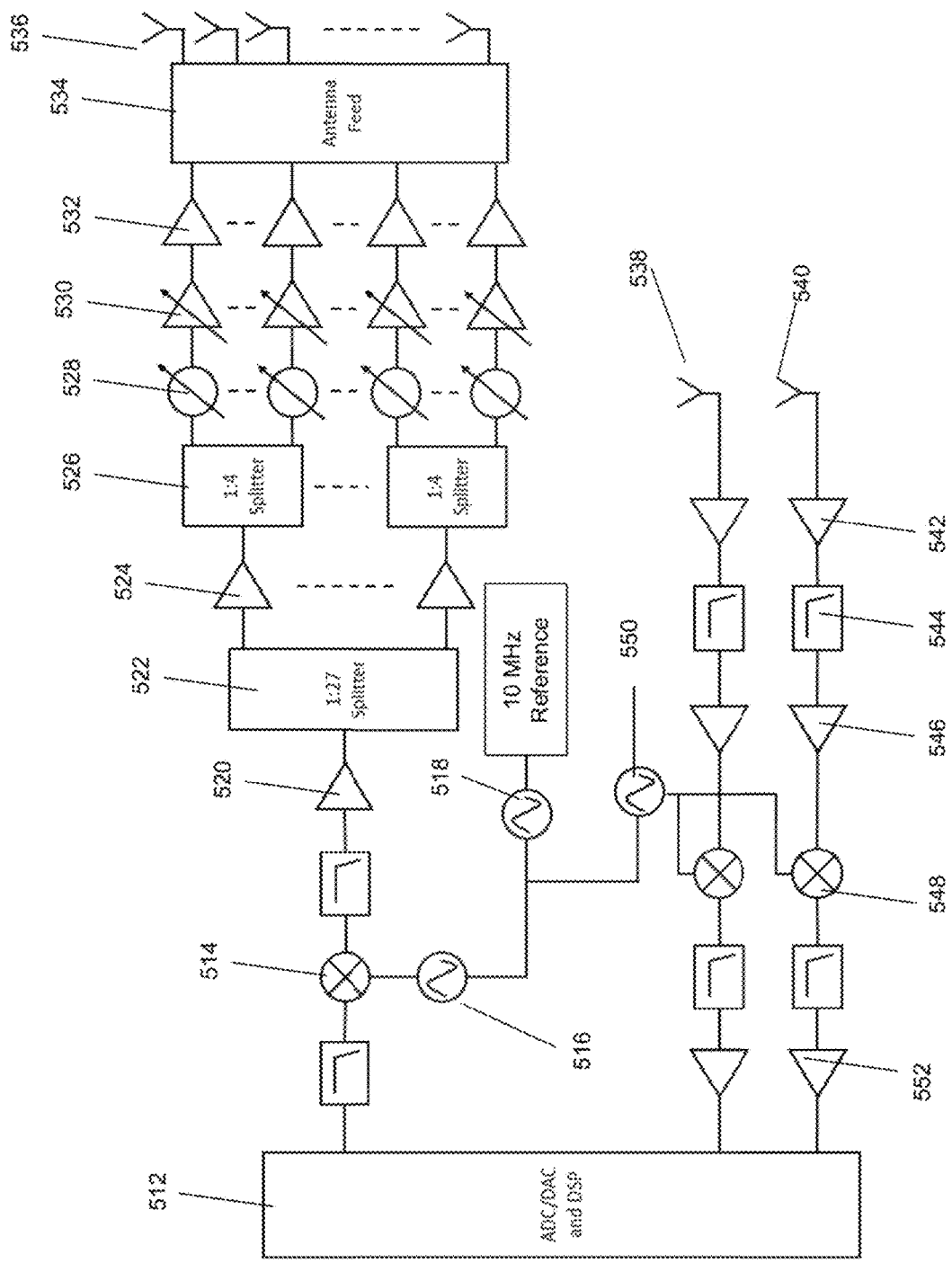
FIG. 5B illustrates a schematic of components of a transmitter system including a transmit phased array antenna in accordance with embodiments of the invention.

FIG. 5B illustrates a schematic of components of a transmitter system including a transmit phased array antenna in accordance with embodiments of the invention. In the illustrated embodiment, 512 is the DAC (digital to analog convert), ADC (analog to digital converter), and/or DSP (digital signal processor) for interfacing between analog and digital domain. It may also handle digital data processing. 514 is a transmit path mixer, which up converts an intermediate frequency (IF) signal to radio frequency (RF) centered around LO (local oscillator) frequency. 516 is a local oscillator, which takes in a precise 100 MHz clock and generates LO as an RF carrier frequency. 518 is a (phase locked loop) PLL that generates a precise 100 MHz clock from a 10 MHz reference source. 520 is a buffer amplifier after up conversion before the phased array corporate feed network.

522 is a 1-to-27 power splitting network to divide the input signal to 27 independent branches. 524 is a buffer amplifier to drive the signal level up before a passive 1-to-4 splitting network. 526 is a 1-to-4 power splitting network to divide the input signal to 4 independent branches. 528 is a phase shifter for controlling the phase of each independent active channel. This could be used for compensating phase variation between channel to channel due to variations such as, but not limited to, manufacture variation, device variation, and/or temperature variation, so that the antenna beam can be formed. 530 is a variable gain amplifier for providing gain adjustment of each independent active channel. This could be used to compensate the gain variation due to phase shift or antenna array tapering. 532 is a power amplifier.

534 is an antenna feed network, which takes the power amplifier output and divides it to feed 32 antenna units. 536 is an antenna array which can include thousands of antenna elements.

538 is a receive vertical polarization antenna. 540 is receive horizontal polarization antenna. 542 is a low noise amplifier, which provides signal amplification while adding very little noise to the system. 544 is a bandpass filter for image rejection before down conversion. 546 is a buffer amplifier, which drives the signal higher before the mixer, which may be lossy. 548 is a receive path mixer, which down converts RF signal to IF. 550 is a local oscillator, which takes in a precise 100 MHz clock and generates LO for down conversion. 552 is an intermediate frequency (IF) amplifier, which drives the IF signal higher before analog to digital conversion (ADC).

Although specific components of a transmitter system are described above with respect to 5B, one skilled in the art will recognize that other components may be used or replaced in the transmitter system in accordance with various embodiments of the invention. Furthermore the particular number of components or inputs or outputs, such as number of antenna elements, etc. may vary in different embodiments.

Figure 6A:
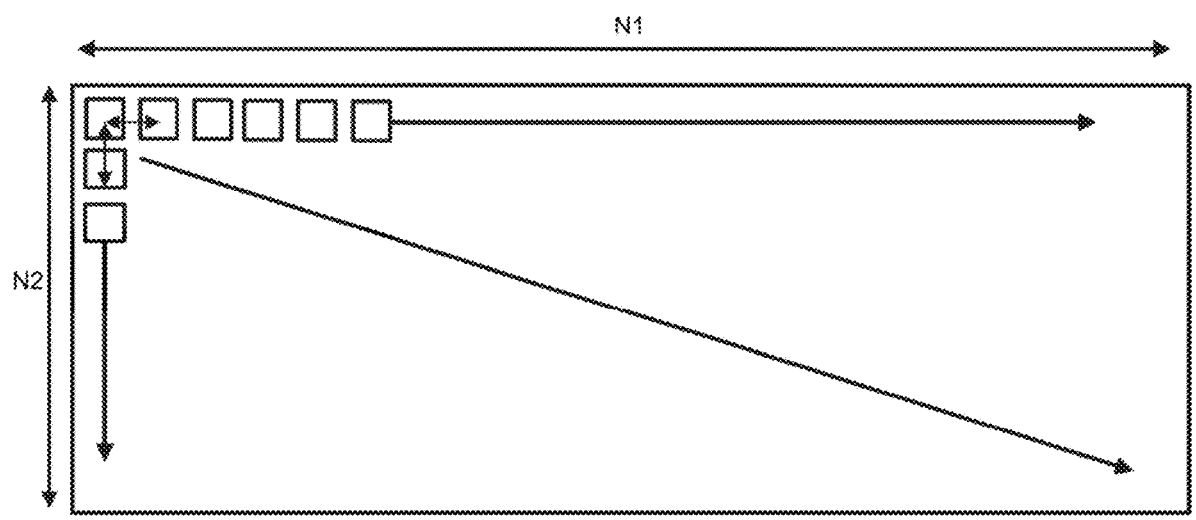
FIG. 6A illustrates a structural layout of a transmit phased array antenna in accordance with embodiments of the invention.

In many embodiments the power amplifier may be configured to feed power to a 4×4 or 8×8 subarray or any other suitable array configuration appropriate to the requirements of a specific system. By way of example, a transmit array in accordance with an embodiment of the invention can include a rectangular array with an M×N structure as shown in FIG. 6A. In accordance with some embodiments of the invention the rectangular structure as illustrated by FIG. 6A utilizes a plurality of subarray feed networks similar to the subarray feed networks illustrated in FIG. 5, thereby resulting in hundreds of subarray amplifiers. FIG. 6E illustrates the results of a simulated gain of a phased array antenna similar to the one illustrated in FIG. 6A. FIGS. 6F and 6G illustrates results of simulated gain of phased array antennas similar to the one illustrated in FIG. 6A.

Figure 6B:
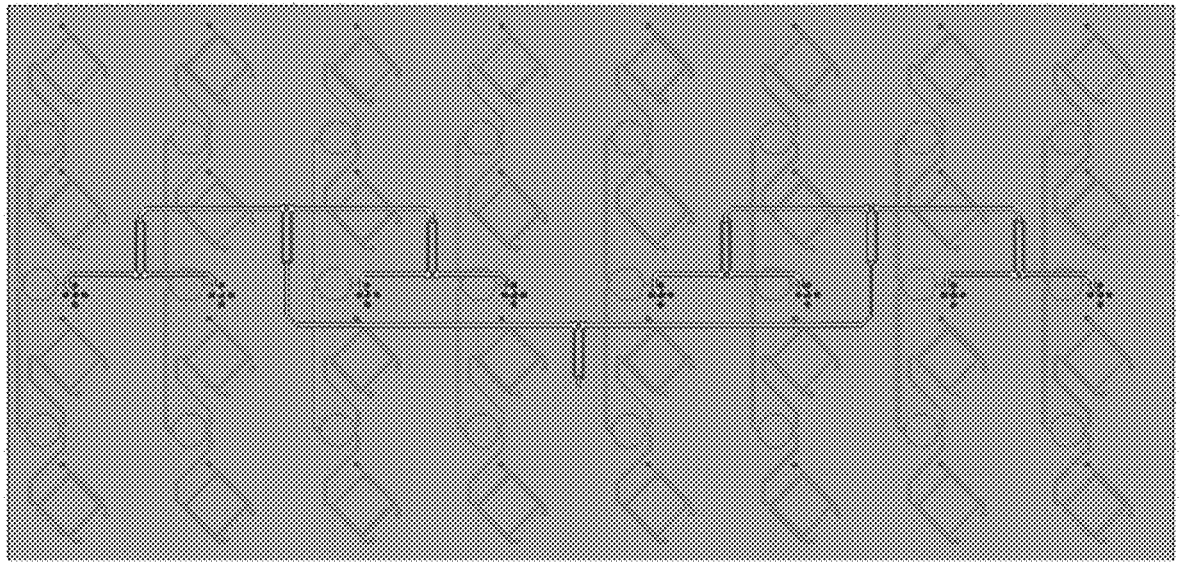
FIG. 6B illustrates a bottom view of an arrangement of patch elements of a transmit phased array antenna in accordance with embodiments of the invention.
Figure 6C:
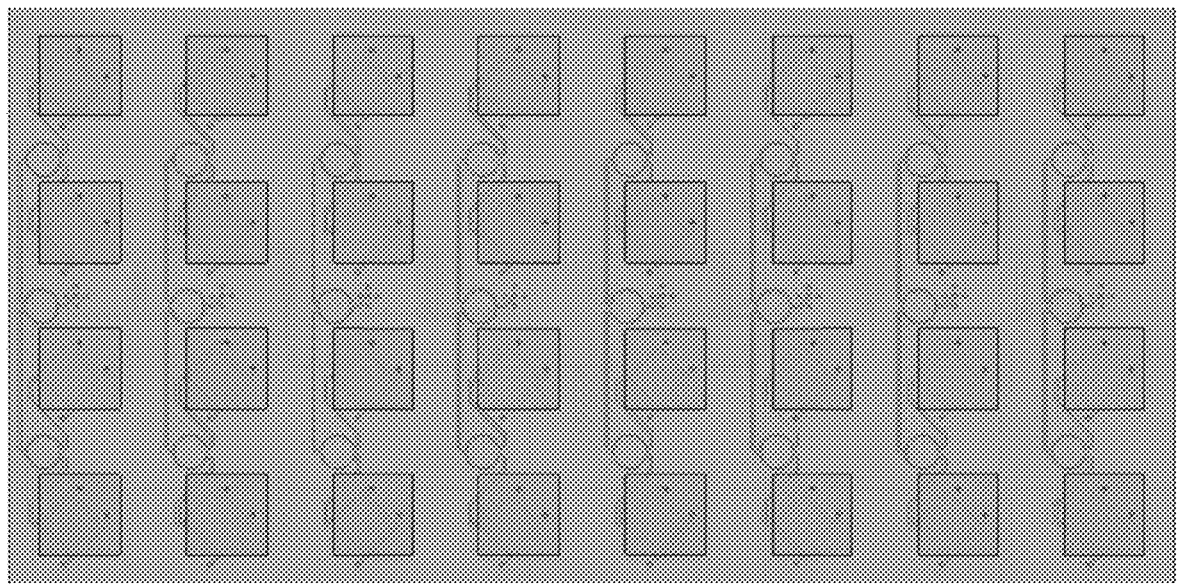
FIG. 6C illustrates a top view of an arrangement of patch elements of a transmit phased array antenna in accordance with embodiments of the invention.

FIG. 6B illustrates a bottom view of an arrangement of 4 by 8 patch elements of a transmit phased array antenna in accordance with embodiments of the invention. In the illustrated embodiment, a central feed is split 1 to 8, each of which is then split 1 to 4 to reach 32 antenna patch elements. FIG. 6C illustrates a top view of an arrangement of patch elements of a transmit phased array antenna in accordance with embodiments of the invention showing a 1 to 8 and 1 to 4 tiered split of the feed.

Figure 6D:
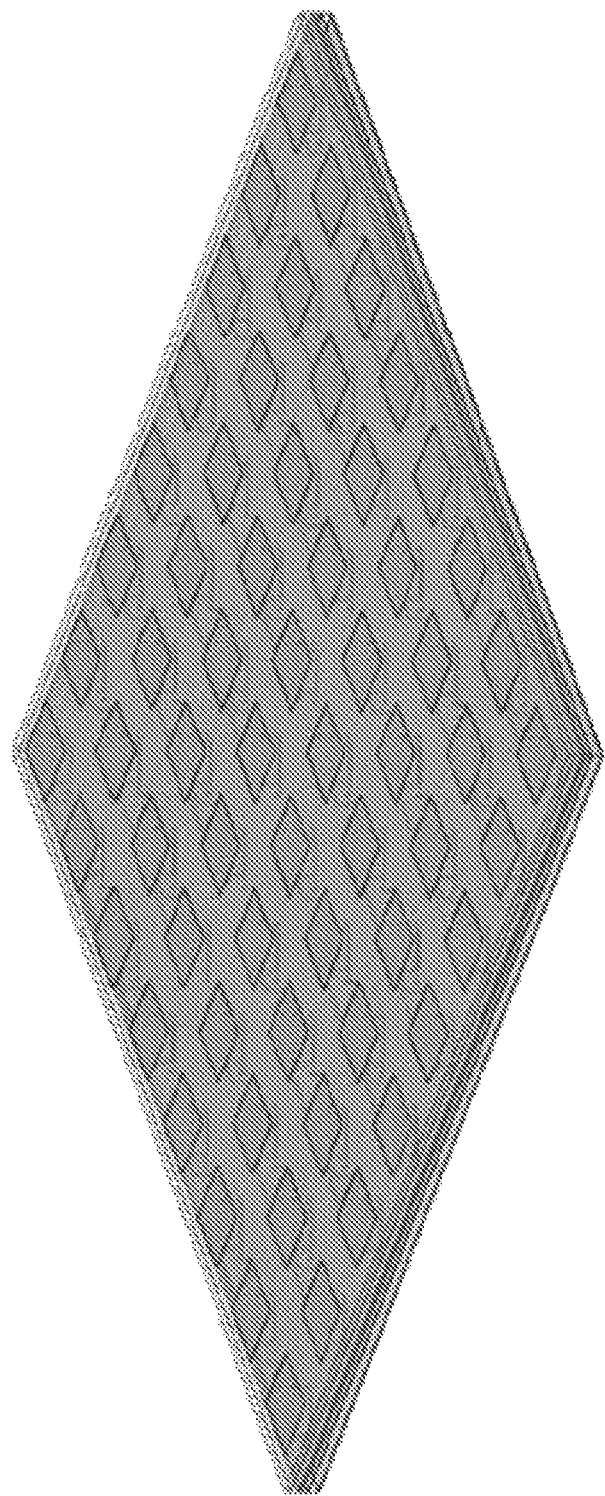
FIG. 6D illustrates a perspective view of an arrangement of patch elements of a transmit phased array antenna in accordance with embodiments of the invention.
Figure 6E:
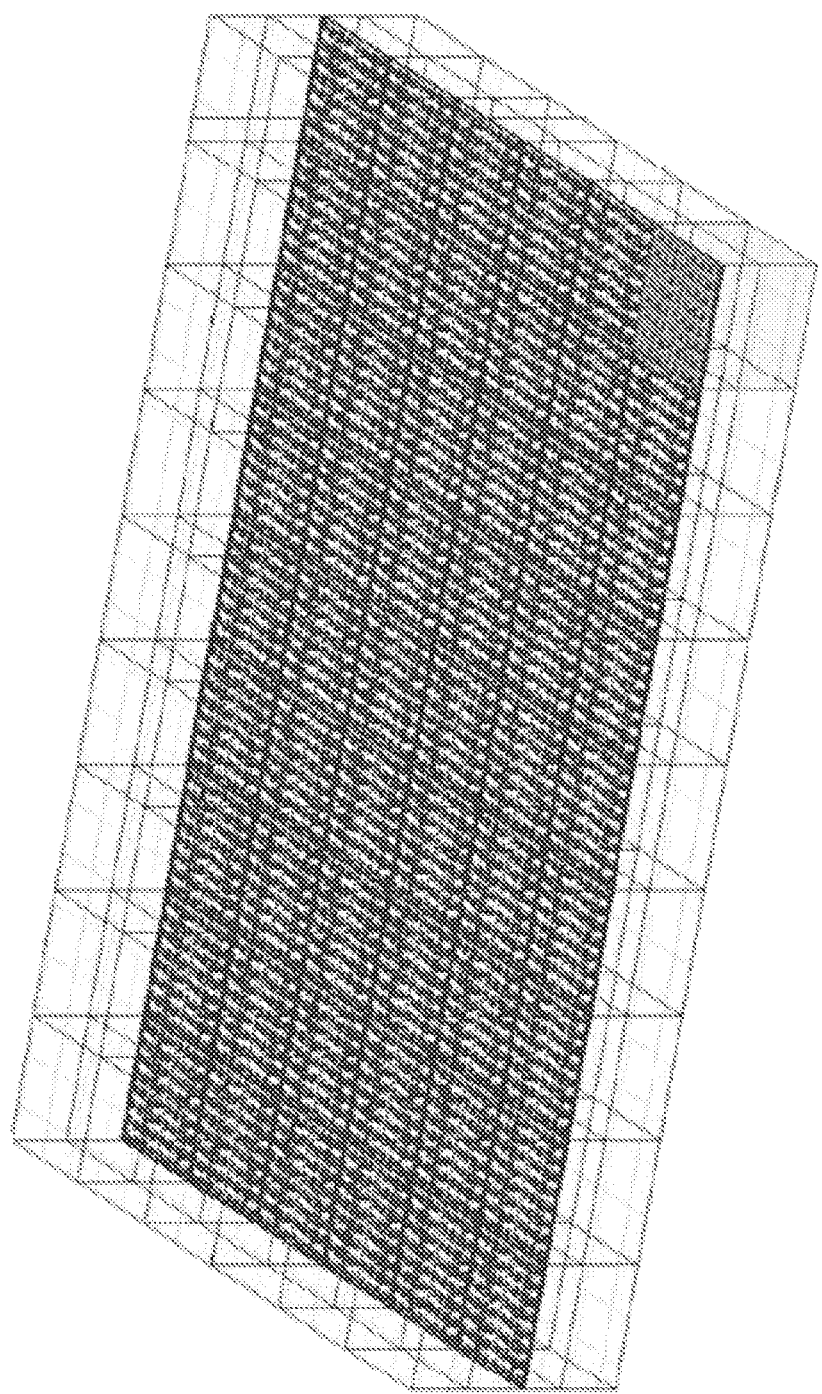
FIG. 6E illustrates a perspective view of an arrangement of patch elements of a transmit phased array antenna in accordance with embodiments of the invention.
Figure 6F:
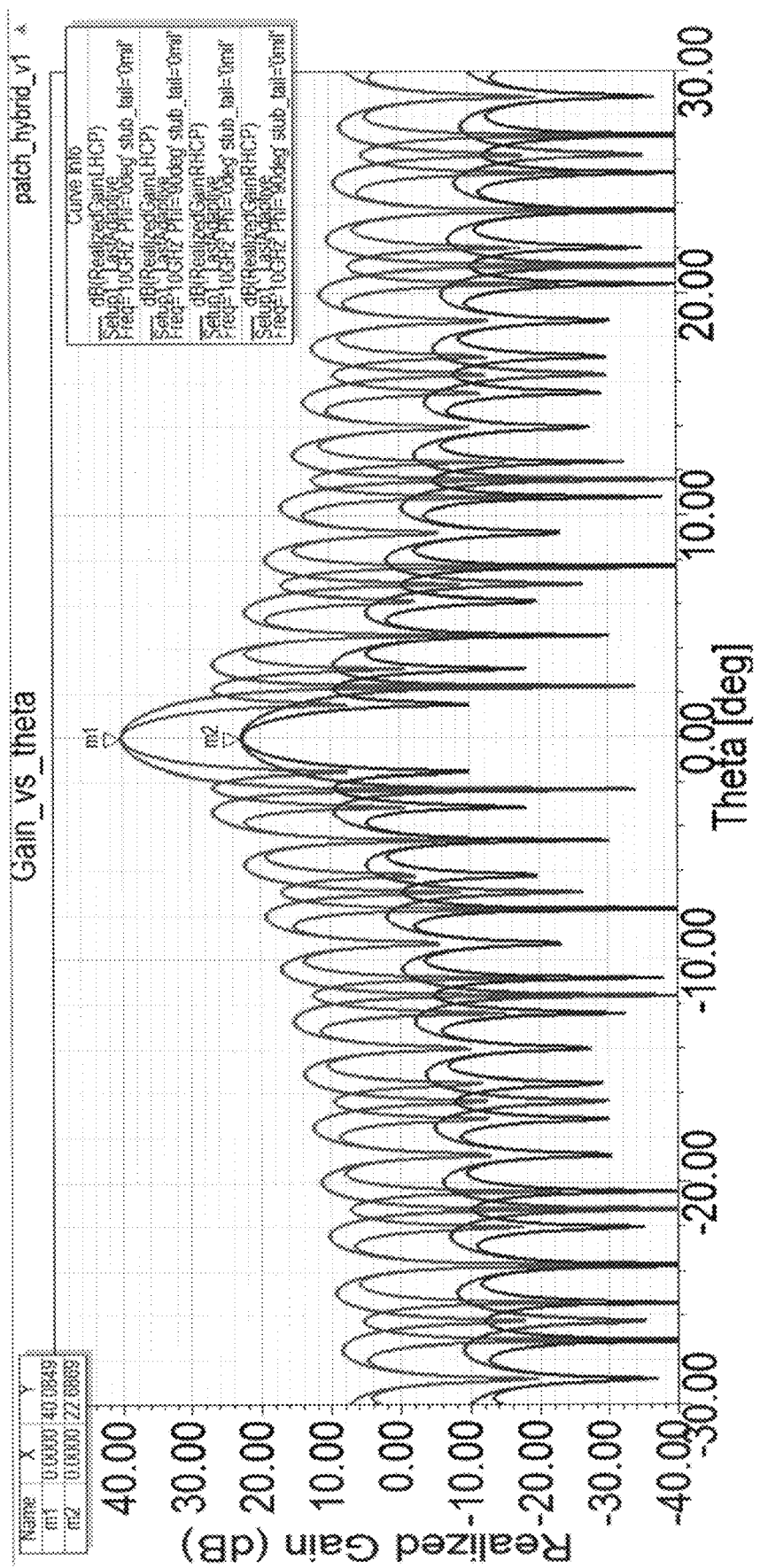
FIG. 6F is a graphical illustration of the simulated gain potential from an example phased array antenna in accordance with embodiments of the invention.
Figure 6G:
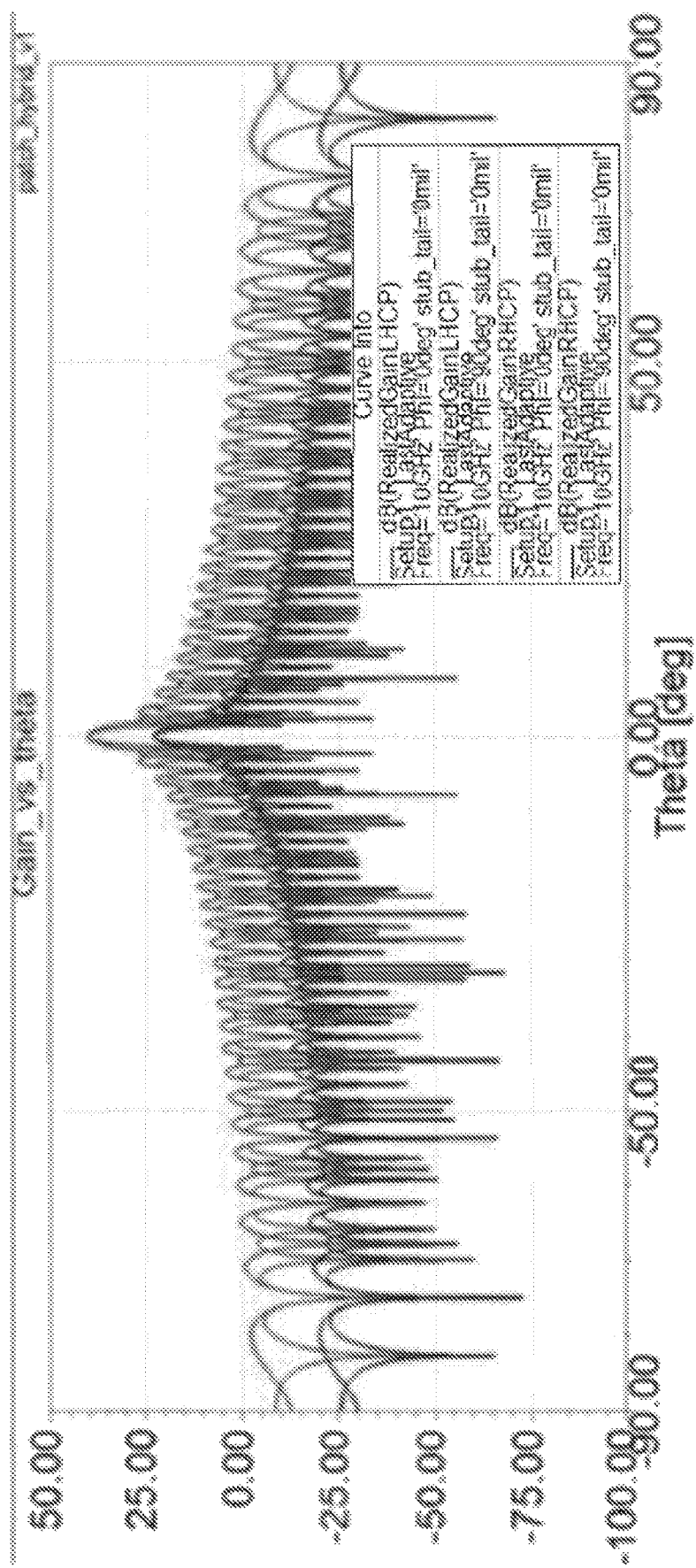
FIG. 6G is a graphical illustration of the simulated gain potential from an example phased array antenna in accordance with embodiments of the invention.

FIG. 6D illustrates a perspective view of an arrangement of 8 by 8 patch elements as a subarray antennas tile of a transmit phased array antenna in accordance with embodiments of the invention. Such a configuration may utilize two 4 by 8 arrangements such as those shown in FIGS. 6B and 6C.

FIG. 6E illustrates a perspective view of an arrangement of patch elements of a transmit phased array antenna in accordance with embodiments of the invention. The illustrated embodiment shows six subarrays by nine subarrays, where each is an eight by eight element subarray.

As can readily be appreciated, the specific array configuration is largely dependent upon the requirements of a given application. While much of the discussion above focuses on the use of a phased array antenna in a bistatic configuration, monostatic phased array antennas can be utilized in radar systems in accordance with various embodiments of the invention. Various receive antennas that can be utilized in combination with a transmit phased array antenna in a number of different bistatic configurations in accordance with several embodiments of the invention are discussed further below.

Reflectarray Receive Antenna

In many embodiments, a SAR system utilizes a receiving reflectarray antenna. The use of a reflectarray antenna structure over the phased array of the transmitter antenna can be desirable in many embodiments, because of the simplicity of the architecture. In several embodiments, the reflectarray receive antenna provides high directivity and efficiency as well as simplicity in power design and overall structure. Reflectarray antennas typically are limited to reflection of incident signals in a narrow band. In a number of embodiments, a broadband reflectarray antenna is implemented by creating a stackup of multiple layers of reflective elements. Each layer of reflective elements can reflect a particular bandwidth of signal and the combination of the layers results in the reflection of a much broader bandwidth of signals. In this way, the signals reflected by the stackup of reflectarray layers at the feed is a sufficiently broadband signal to meet the requirements of a given application.

Figure 9A:
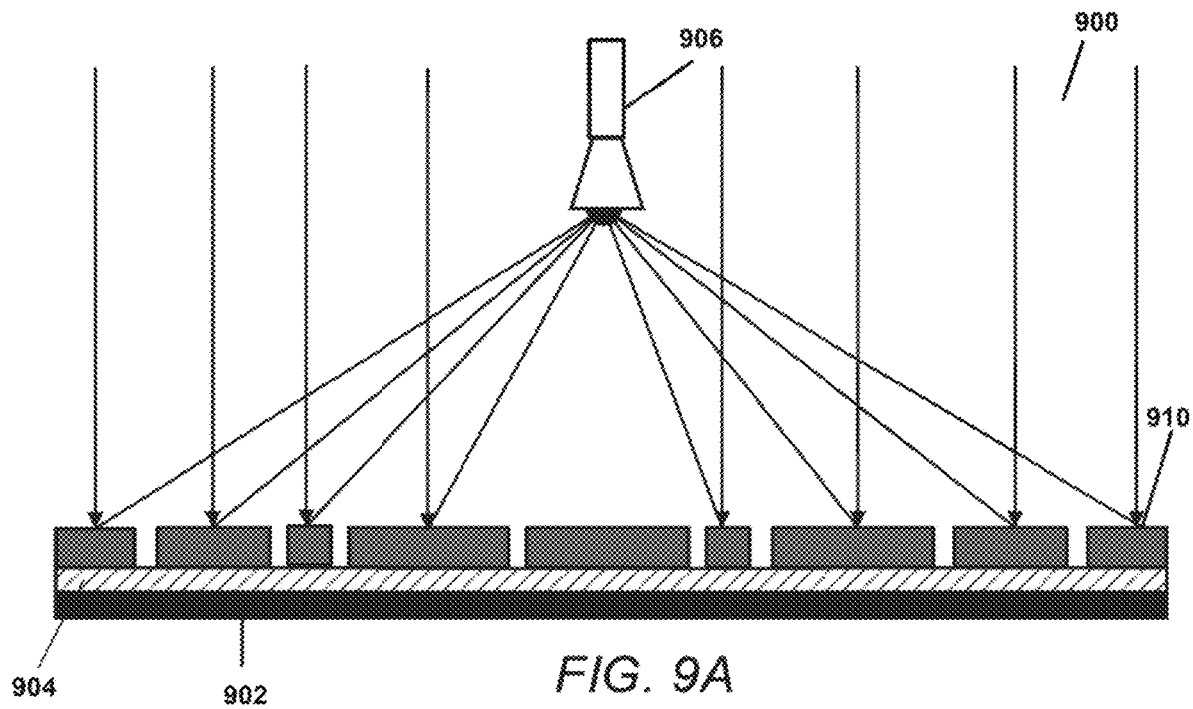
FIG. 9A is an illustration of a planar reflectarray receive antenna in accordance with many embodiments of the invention.
Figure 9B:
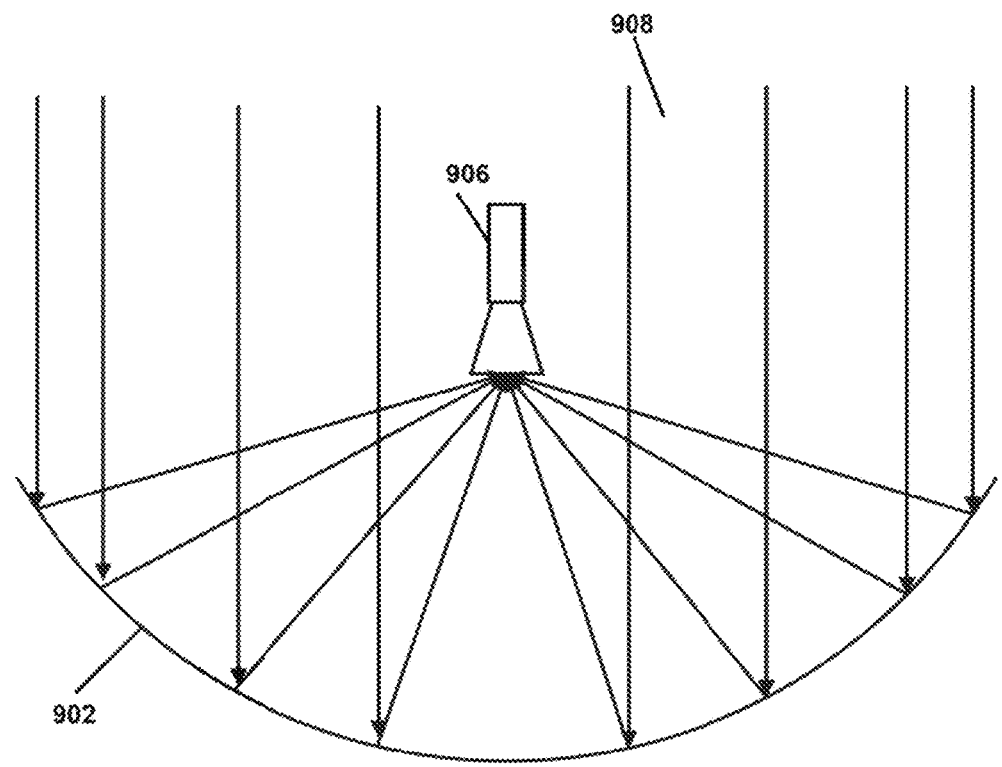
FIG. 9B is an illustration of a parabolic reflectarray receive antenna.

A reflectarray receive antenna does not require any power supply network for the individual patch elements or reflective elements. In a number of embodiments, the reflectarray receive antenna simply uses a single kW class amplifier connected to a feed element (906) as illustrated in FIG. 9A. In some embodiments the feed element (906) may be connected to at least one Low Noise Amplifier (LNA) to improve the output signal without excessive noise distortion or temperature fluctuation. The feed element (906) may be configured to receive modified reflected waves from the reflective elements (910) configured to produce the desired radiation pattern. In some embodiments the feed element (906) may be place at the respective focal point of the equivalent parabolic reflector (908).

Figure 10A:
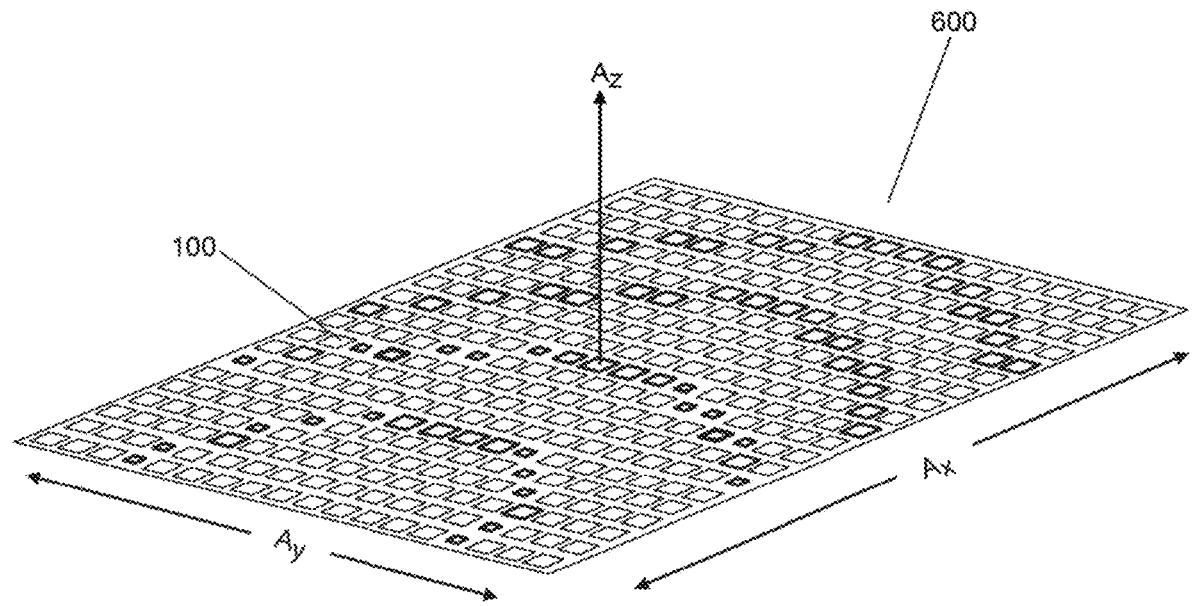
FIG. 10A is an illustration of a multi-layer reflectarray receive antenna including elements mounted to a surface in accordance with many embodiments of the invention.
Figure 11:
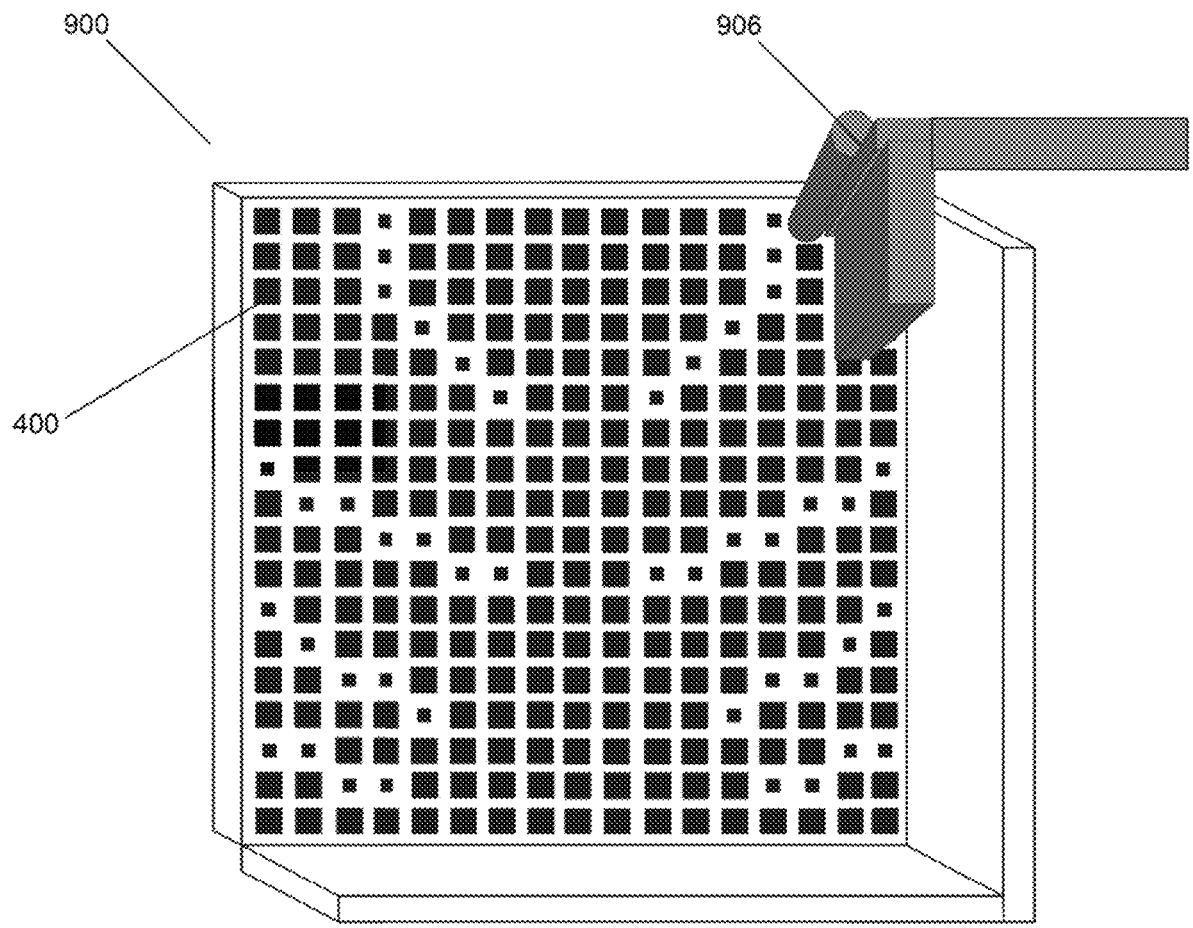
FIG. 11 is an illustration of the external structure of a reflectarray antenna in accordance with embodiments of the invention.

In a number of embodiments, the reflective elements (910) of a single layer within the stackup of layers of reflective elements provide a specific bandwidth, cross polarization, and phase shift. In several embodiments, these specification can be achieved using a periodic boundary approach to the layout and design of the reflective elements. In many embodiments the periodic boundary approach is the preferred method. In some embodiments of the invention the size of the reflective elements (910) is a function of the desired phase shift. The elements with the desired phase shift may be disposed on a substrate (904) which may be further disposed on a very low resistance material such as (but not limited to) a highly conductive metal and/or a material that exhibits superconductivity at the operational temperature of the SAR system (902). Each additional layer of the reflectarray can be formed on an additional substrate and combined in a stackup of reflectarray layers using conventional printed circuit board manufacturing techniques. The reflective elements (910) with the desired phase shift may be spaced at half-wavelength spacing to produce the desired radiation pattern in accordance with many embodiments of the invention. An embodiment of a desired array of reflective elements in accordance with the respective size is illustrated in FIGS. 10A and 11. The reflective elements (910) that are located near the edges of the array are likely to have higher phase shifts and are thus implemented using alternative configurations to produce the desired radiative wave pattern. As can readily be appreciated, any of a variety of configurations of reflective elements can be utilized as appropriate to the requirements of a given application.

In many embodiments of the invention the reflective elements (910) may be arranged within the substrate such that the desired radiation pattern allows for the positioning of the feed element (906) to be offset from the focal point as illustrated in FIG. 11. As illustrated in FIGS. 10A and 11 a grid pattern of reflective elements (910) is configured in accordance with some embodiments of the invention to produce the desired radiation wave pattern directed to the feed element (906) whether it is offset or centered about the focal point. Although FIGS. 10A and 11 illustrate a specific pattern of reflective elements (910) in relation to the feed element (906) it should be understood that any suitable pattern may be configured to reach the desired radiation wave patterns.

Figure 10B:
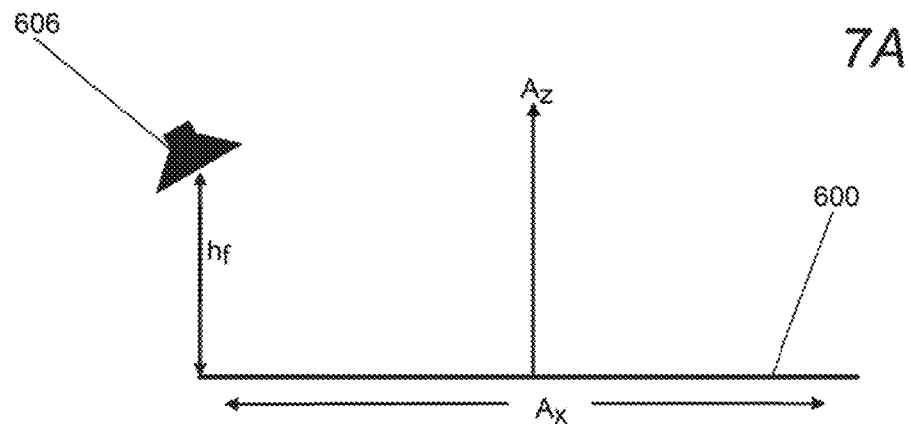
FIG. 10B is an illustration of the feed geometry of a reflectarray antenna in accordance with embodiments of the invention.
Figure 10C:
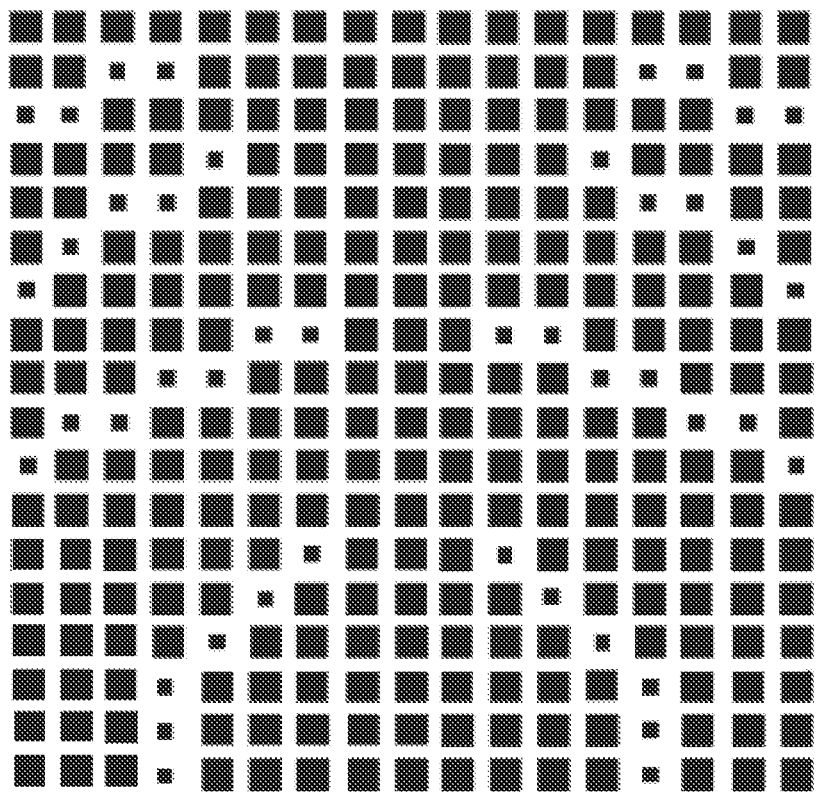
FIG. 10C is a photograph fabricated multilayer reflectarray antenna in accordance with embodiments of the invention.

FIG. 10B is an illustration of the feed geometry of a reflectarray antenna in accordance with embodiments of the invention. FIG. 10C is a photograph fabricated multilayer reflectarray antenna in accordance with embodiments of the invention.

Figure 12:
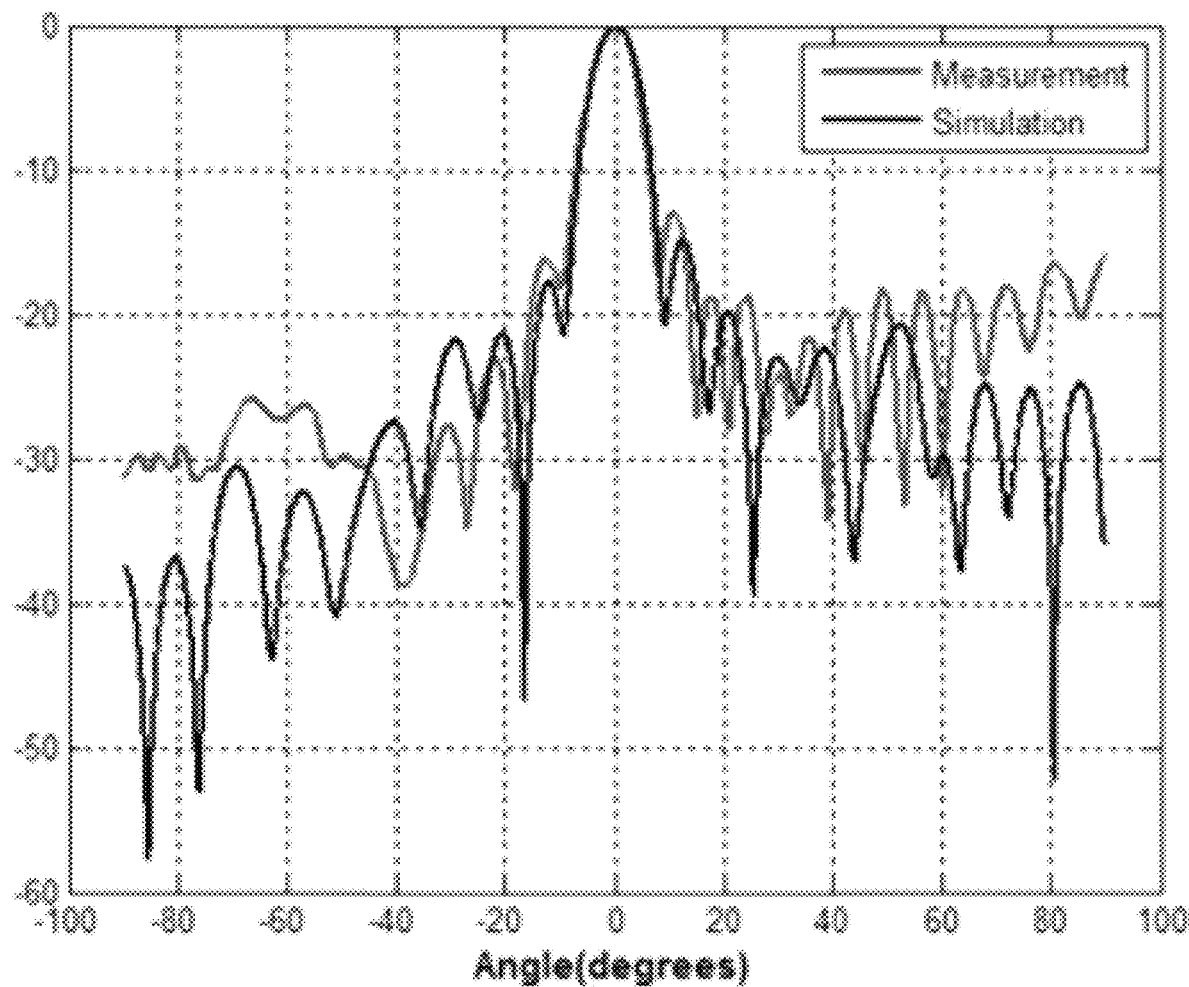
FIG. 12 is a graphical illustration of the simulated and measured beam pattern from an example reflectarray antenna in accordance with many embodiments of the invention.
Figure 12A:
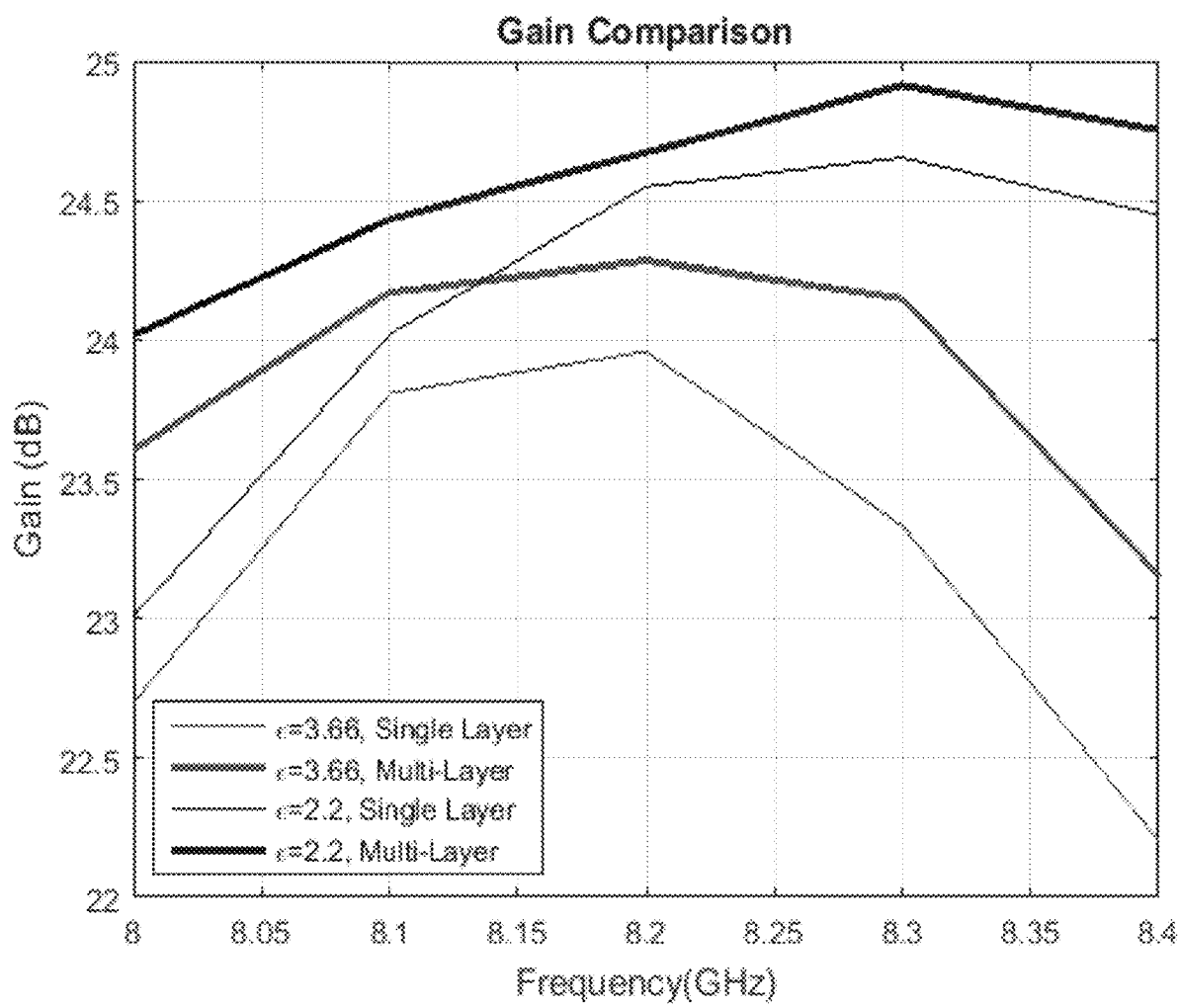
FIG. 12A is a graphical illustration of a gain comparison of a single layer vs multi-layer reflectarray patterned on materials with different dielectric constants.

FIG. 12 is a graphical illustration of the simulated and measured beam pattern at a frequency of 8.2 GHz from an example reflectarray antenna with er=3.66 in accordance with many embodiments of the invention. FIG. 12A is a graphical illustration of a gain comparison of a single layer vs multi-layer reflectarray patterned on materials with different dielectric constants. As can be seen in these results, the multilayer reflectarray on a low-dielectric constant material (er=2.2) often produces the highest gain and the largest bandwidth.

In a number of embodiments, the SAR system includes a bistatic configuration of antennas including a transmit modular phased array antenna and a reflectarray receive antenna. The SAR system can employ a housing including two surfaces mounted at an angle with respect to each other. The elements of the phased array antenna can be mounted on one surface and the reflective elements of the reflectarray receive antenna can be mounted on the other surface. In many embodiments, the transmit antenna array and reflectarray receive antenna are configured for a frequency range of operation of 9.5 GHz to 9.8 GHz. In other embodiments, the specific frequency range of the transmitted radar signals is determined based upon the requirements of specific applications.

In certain embodiments, the SAR system is collapsible and the two surfaces on which the respective elements are mounted are contained within the interior of the SAR system when collapsed. In several embodiments, the antenna feed of the receive antenna is mounted on an antenna arm that collapses when the SAR system is collapsed. In a number of embodiments, the antenna feed is located between the two surfaces on which the respective elements are disposed when the SAR system is collapsed. As can be appreciated, any of a variety of mechanical mounting structures, housing, antennas, and/or combinations of antennas can be utilized within SAR systems as appropriate to the requirements of specific applications in accordance with various embodiments of the invention.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A transmit and receive antenna system comprising:
    a transmit phased antenna array configured to transmit a plurality of radio frequency transmit signals, the transmit phased antenna array comprising:
        a plurality of patch antenna elements mounted to a printed circuit board, each patch antenna element belonging to a subarray; and
        a power splitting network configured divide an input signal into a plurality of branches each of the plurality of branches has at least one phase shifter and one or more power amplifiers, each power amplifier feeding an antenna feed network connected to each subarray of each of the plurality of patch antenna elements; and
    a reflectarray receive antenna configured to receive radio frequency signals comprising:
        a plurality of reflectarray antenna elements mounted to a printed circuit board;
        at least one antenna feed configured to receive radio frequency signals reflected from the plurality of reflectarray antenna elements; and
        at least one low noise amplifier electrically connected to the at least one antenna feed.

2. The transmit and receive antenna system of claim 1, wherein the power splitting network further comprises at least one Wilkinson divider.

3. The transmit and receive antenna system of claim 1, wherein each power amplifier of the transmit phased antenna array is configured to generate at least a 15 watt output.

4. The transmit and receive antenna system of claim 1, wherein each power amplifier of the transmit phased antenna array is a gallium nitride amplifier.

5. The transmit and receive antenna system of claim 1, wherein the transmit phased antenna array further comprises at least one copper plate embedded in the printed circuit board.

6. The transmit and receive antenna system of claim 1, wherein the transmit phased antenna array further comprises at least one power amplifier embedded in the printed circuit board.

7. The transmit and receive antenna system of claim 1, wherein the at least one low noise amplifier of the receive reflectarray comprises at least two low noise amplifiers each configured to receive and amplify a radio frequency signal of a different polarization.

8. The transmit and receive antenna system of claim 1, wherein the transmit phased antenna array and receive reflectarray are configured for a frequency range of operation of 9.5 GHz to 9.8 GHz.

9. The transmit and receive antenna system of claim 1, wherein the printed circuit board of the receive reflectarray comprises a (polytetrafluoroethylene) PTFE dielectric material.

10. The transmit and receive antenna system of claim 1, wherein for the transmit phased antenna array includes a single digital to analog converter and upconverter.

11. The transmit and receive antenna system of claim 1, wherein the receive reflectarray includes a stack of receive reflectarrays.

12. The transmit and receive antenna system of claim 11, wherein the bandwidth of the signal reflected by the receive reflectarray is broader than the bandwidth of the single reflected by at least one of the reflectarrays in the stack of reflectarrays.

13. The transmit and receive antenna system of claim 11, wherein the bandwidth of the signal reflected by the receive reflectarray is broader than the bandwidth of the single reflected by each of the reflectarrays in the stack of reflectarrays.

14. The transmit and receive antenna system of claim 1, wherein the transmit phased antenna and the reflectarray receive antenna are mounted to two separate surfaces of a housing.

15. The transmit and receive antenna system of claim 14, wherein the housing is configured to collapse and the transmit phased antenna and the reflectarray receive antenna are contained within the housing when the housing is collapsed.

16. The transmit and receive antenna system of claim 15, wherein the antenna feed of the reflectarray receive antenna is mounted to a feed arm that is configured to collapse.

17. The transmit and receive antenna system of claim 16, wherein the feed arm is configured to be contained within the housing between the two separate surfaces on which the transmit phased antenna and the reflectarray receive antenna are mounted when the housing is collapsed.

18. The transmit and receive antenna system of claim 1, wherein each of the plurality of branches has at least one phase shifter for controlling the phase of each branch.

19. A transmit and receive antenna system comprising:
a transmit phased antenna array configured to transmit a plurality of radio frequency transmit signals, the transmit phased antenna array comprising:
a plurality of patch antenna elements mounted to a printed circuit board, each patch antenna element belonging to a subarray;
a power splitting network configured divide an input signal into a plurality of branches each of the plurality of branches has at least one phase shifter and one or more power amplifiers, each power amplifier feeding an antenna feed network connected to each subarray of each of the plurality of patch antenna elements; and
a feed that feeds the one or more power amplifiers and comprises a single digital to analog converter and a single upconverter; and
a reflectarray receive antenna configured to receive radio frequency signals comprising:
a stackup of a plurality of layers of reflectarray antenna elements;
at least one antenna feed configured to receive radio frequency signals reflected from the plurality of reflectarray antenna elements; and
at least one low noise amplifier electrically connected to the at least one antenna feed.

20. The transmit and receive antenna system of claim 19, wherein:
each power amplifier of the transmit phased antenna array is a gallium nitride amplifier; and
the transmit phased antenna array and reflectarray receive antenna are configured for a frequency range of operation of 9.5 GHz to 9.8 GHz.

21. A transmit and receive antenna system comprising:
a transmit phased antenna array mounted to first surface of a housing and configured to transmit a plurality of radio frequency transmit signals, the transmit phased antenna array comprising:
a plurality of patch antenna elements mounted to a printed circuit board, each patch antenna element belonging to a subarray; and
a power splitting network configured divide an input signal into a plurality of branches each of the plurality of branches has at least one phase shifter and one or more power amplifiers, each power amplifier feeding an antenna feed network connected to each subarray of each of the plurality of patch antenna elements; and
a reflectarray receive antenna mounted to a second surface of the housing and configured to receive radio frequency signals comprising:
a plurality of reflectarray antenna elements mounted to a printed circuit board;
at least one antenna feed mounted to a feed arm configured to receive radio frequency signals reflected from the plurality of reflectarray antenna elements; and
at least one low noise amplifier electrically connected to the at least one antenna feed;
wherein the housing is configured to collapse and the transmit phased antenna and the reflectarray receive antenna are contained within the housing when the housing is collapsed;
wherein feed arm to which the antenna feed of the reflectarray receive antenna is mounted is configured to collapse; and
wherein the feed arm is configured to be contained within the housing between the two separate surfaces on which the transmit phased antenna and the reflectarray receive antenna are mounted when the housing is collapsed.

* * * * *